US010775226B2

(12) United States Patent
Sanhaji et al.

(10) Patent No.: US 10,775,226 B2
(45) Date of Patent: *Sep. 15, 2020

(54) APPARATUS AND METHOD FOR LOCKING A STORAGE TANK ABOVE A SCALE FOR TRANSPORTATION

(71) Applicant: Snap-on Incorporated, Kenosha, WI (US)

(72) Inventors: Rahhali Sanhaji, Sesto Fiorentino (IT); Craig F. Govekar, Gurnee, IL (US)

(73) Assignee: Snap-on Incorporated, Kenosha, WI (US)

( * ) Notice: Subject to any disclaimer, the term of this patent is extended or adjusted under 35 U.S.C. 154(b) by 378 days.

This patent is subject to a terminal disclaimer.

(21) Appl. No.: 15/876,705

(22) Filed: Jan. 22, 2018

(65) Prior Publication Data

US 2019/0120434 A1 Apr. 25, 2019

(30) Foreign Application Priority Data

Oct. 20, 2017 (IT) .......................... 102017000119259

(51) Int. Cl.
*G01G 19/52* (2006.01)
*G01G 19/08* (2006.01)
(Continued)

(52) U.S. Cl.
CPC ............ *G01G 19/08* (2013.01); *B66F 17/006* (2013.01); *G01G 17/04* (2013.01); *G01G 21/18* (2013.01); *F17C 2250/0421* (2013.01)

(58) Field of Classification Search
CPC ... B65B 1/46; B65B 3/28; F25B 45/00; F25B 2345/0051; F25B 2345/0052;
(Continued)

(56) References Cited

U.S. PATENT DOCUMENTS 2,358,770 A * 9/1944 Carliss ................. G01G 19/083
177/130
4,513,578 A 4/1985 Proctor et al.
(Continued)

FOREIGN PATENT DOCUMENTS

DE 202006001376 U1 6/2007
DE 20 2006 001 376 U1 7/2007
(Continued)

OTHER PUBLICATIONS

European Patent Office, European Search Report for European Patent Application No. 18201746.7-1008 dated Dec. 14, 2018, along with one page coversheet and information on search strategy sheet.
(Continued)

*Primary Examiner* — Gregory W Adams
(74) *Attorney, Agent, or Firm* — McDonnell Boehnen Hulbert & Berghoff LLP

(57) ABSTRACT

An apparatus including a first storage tank, a frame positioned at least partially beneath the first storage tank, a first lever having a first end and a second end, and the first lever is pivotally mounted to the frame; and a first scale system positioned beneath the first storage tank, wherein in a first position, the first storage tank exerts a force against the first scale system, and wherein in a second position, the second end of the lever exerts a force on a bottom surface of the first storage tank such that the first storage tank is positioned above, and out of contact with, the first scale system, when the first storage tank is in the second position.

29 Claims, 13 Drawing Sheets

(51) Int. Cl.
  *G01G 17/04* (2006.01)
  *B66F 17/00* (2006.01)
  *G01G 21/18* (2006.01)

(58) Field of Classification Search
  CPC .............. F25B 2345/007; G01G 17/04; G01G 23/005; G01G 19/22; G01G 19/12; G01L 1/26
  See application file for complete search history.

(56) References Cited

U.S. PATENT DOCUMENTS

| | | | |
|---|---|---|---|
| 4,688,388 A | 8/1987 | Lower et al. | |
| 4,726,435 A | 2/1988 | Kitagawa et al. | |
| 4,878,356 A | 11/1989 | Punches et al. | |
| 5,046,322 A | 9/1991 | Bulla et al. | |
| 5,125,626 A * | 6/1992 | Lonsway | B62B 3/0625 254/8 R |
| 5,172,562 A | 12/1992 | Manz et al. | |
| 5,193,351 A | 3/1993 | Laukhuf et al. | |
| 6,119,475 A | 9/2000 | Murray et al. | |
| 6,124,554 A * | 9/2000 | Muckle | G01G 19/083 177/126 |
| 7,254,954 B2 | 8/2007 | Govekar et al. | |
| 7,310,956 B2 | 12/2007 | Meldahl et al. | |
| 7,310,964 B2 | 12/2007 | Govekar | |
| 7,905,095 B2 | 3/2011 | Suharno et al. | |
| 8,429,921 B2 | 4/2013 | Suharno et al. | |
| 9,366,488 B2 | 6/2016 | Sanhaji | |
| 10,329,037 B2 * | 6/2019 | Govekar | F25B 45/00 |
| 2007/0007047 A1 * | 1/2007 | Gruson | G01G 13/2851 177/116 |
| 2009/0145143 A1 | 6/2009 | McMasters | |
| 2009/0158756 A1 | 6/2009 | Brown et al. | |
| 2011/0203675 A1 | 8/2011 | Rahhali | |
| 2013/0284277 A1 | 10/2013 | Rahhali | |
| 2013/0312434 A1 | 11/2013 | Sanhahi | |
| 2014/0144714 A1 | 5/2014 | Kjar | |
| 2014/0166374 A1 | 6/2014 | Deng et al. | |
| 2014/0245809 A1 * | 9/2014 | Muelich | G01G 23/012 73/1.13 |
| 2015/0107279 A1 | 4/2015 | Sanhaji | |
| 2015/0231583 A1 * | 8/2015 | Maguire | G01G 19/24 366/141 |
| 2018/0164008 A1 | 6/2018 | Sanhaji | |

FOREIGN PATENT DOCUMENTS

| | | |
|---|---|---|
| EP | 3040652 A1 | 6/2016 |
| FR | 2888321 | 1/2007 |
| WO | 2014165248 A1 | 10/2014 |
| WO | 2018007416 A1 | 1/2018 |

OTHER PUBLICATIONS

Bacharach, Inc.; Stinger Refrigerant Recovery Unit; User Manual 2090-0217 Rev. 6; Apr. 2012.
Bosch Automotive Service Solutions LLC; Recovery/Recycling/Recharging Unit Operating Manual, Model 17800B / 17801B; Sep. 9, 2013.
Bosch Automotive Service Solutions LLC; Operating Manual for Model 34988 Recovery, Recycling, Recharging Unit; 554228 Rev. E; Jul. 30, 2013.
Ministero Dello Sviluppo Economico; Search Report and Written Opinion for Italian Patent Application No. IT 201700119259 completed Mar. 19, 2018.
Snap-On Incorporated; Air Conditioning Equipment and Tools 2010 Catalog; Feb. 24, 2010.
Snap-On Incorporated; A/C Equipment and Tools; Are you Ready for A/C Season?; Mar. 26, 2013.
Snap-On Incorporated; Service Center, A/C, ECO Plus, R134a; downloaded from the World Wide Web at https://store.snapon.com/ECO-Plus-A-C-Service-Center_R134a-Service-Center-A-C-ECO-trade-Plus-R134a-P6478708.aspx; Mar. 21, 2016.
Propane 101; Promoting Propane Safety Through Better Understanding; downloaded from the World Wide Web at http://www.propane101.com/consumerlpgcylinderparts.htm; Jun. 27, 2016.
Mastercool, Inc.; Mastercool ECK1800 user manual—downloaded from the world wide web at http://www.mastercool.com/wp-content/uploads/2015/03/copia_di_d000004039_0002_0001.pdf; Mar. 2015, pp. 1-39 (English).
Snap-On Incorporated; ECO Xtreme User's Manual, Mar. 7, 1997.
Italian Search Report for IT 201700119259 dated Mar. 19, 2018, pp. 1-7.

* cited by examiner

APPARATUS AND METHOD FOR LOCKING A STORAGE TANK ABOVE A SCALE FOR TRANSPORTATION

BACKGROUND

This application claims priority to Italian Application No. 102017000119259 entitled "Apparatus and Method for Locking a Storage Tank Above a Scale For Transportation" filed on Oct. 20, 2017, which is incorporated by reference herein in its entirety.

Many vehicles come equipped with systems that utilize refrigerants, such as air conditioning systems, for example. The refrigerant (1,1,1,2-tetrafluoroethane—R-134a, for example) contained within such systems may need to be supplemented, recycled, or removed on occasion. In order to remove or add the refrigerant, refrigerant recovery and delivery units can be used. To meet certain recovery standards, or to add refrigerant, such refrigerant recovery and delivery units can measure an amount of refrigerant that has been removed from or added to a vehicle.

Refrigerant recovery and delivery units can be equipped with a storage tank for storing refrigerant. In order to determine the amount of refrigerant that has been removed from or added to the vehicle, the storage tank and any contents thereof may be weighed to determine the mass of refrigerant within the storage tank using a scale system that measures the weight of the storage tank and its contents. In some cases, the storage tanks and scale systems can be prone to vibration or movement during transportation of the refrigerant recovery and delivery unit from one location to another. In addition, if the vehicle transporting the storage tank and scale system within the refrigerant recovery and delivery system encounters a bumpy ride, the storage tank and scale system can be jostled or experience jolts. These conditions can lead to damage inflicted on the scale system. For example, under these conditions, the storage tank can impact a load cell within the scale system, thereby damaging the load cell.

Accordingly, it would be desirable to provide a system that helps to prevent damage to the scale system when the refrigerant recovery and delivery unit is being transported from one location to another.

SUMMARY

The present disclosure provides an apparatus for lifting a storage tank of a refrigerant recovery and delivery unit above and out of contact with a scale system, to prevent damage to the scale system from vibration, movement, jostling, or jolting, that may occur during transportation of the refrigerant recovery and delivery unit from one location to another. A hand-operated lever can be moved from a first, unlocked position where the storage tank is in contact with the scale system, to a second, locked position where an end of the lever exerts a force on a bottom of the storage tank to move the storage tank into the second, locked position where the storage tank is positioned above, and out of contact with, the scale system. In this manner, the scale system is not subject to damage from the storage tank during transportation of the refrigerant recovery and delivery unit from one location to another when the storage tank is in the locked position out of contact with the scale system. Two storage tanks may be positioned within the refrigerant recovery and delivery unit with a first lever extending through a first side wall and a second lever extending through a second side wall. The first lever is useful for lifting a first storage tank into a raised, locked position and for lowering the first storage tank into a lowered, unlocked position where the storage tank and contents therein may be weighed. The second lever is useful for lifting a second storage tank into a raised, locked position and for lowering the second storage tank into a lowered, unlocked position where the storage tank and contents therein may be weighed.

The present disclosure further provides for a method of lifting a storage tank of a refrigerant recovery and delivery unit above and out of contact with a scale system, to prevent damage to the scale system from vibration, movement, jostling, or jolting, that may occur during transportation of the refrigerant recovery and delivery unit from one location to another. The method includes moving an end of a lever to move the lever from a first position where the storage tank is in contact with the scale system, to a second raised position where an end of the lever exerts a force on a bottom of the storage tank to move the storage tank into a raised locked position where the storage tank is positioned above, and out of contact with, the scale system. In this manner, the method provides that the scale system is not subject to damage during transportation of the refrigerant recovery and delivery unit from one location to another when the storage tank has been moved to the second raised position in which the storage tank is out of contact with the scale system.

In one aspect, an apparatus is provided having a first storage tank, a frame positioned at least partially beneath the first storage tank, a first lever having a first end and a second end, and the first lever is pivotally mounted to the frame; and a first scale system positioned beneath the first storage tank, wherein in a first position, the first storage tank exerts a force against the first scale system, and wherein in a second position, the second end of the lever exerts a force on a bottom surface of the first storage tank such that the first storage tank is positioned above, and out of contact with, the first scale system, when the first storage tank is in the second position.

The apparatus may further include having the first end of the first lever extending through a first side wall and operable by a user to move the first lever and first storage tank from the first position to the second position, and may also further include having the first side wall include a boundary of an aperture having a notch and the first end of the first lever is positioned underneath the notch when the first lever and first storage tank are in the second position.

The apparatus may also further include a second storage tank, a second lever having a first end and a second end, and the second lever is pivotally mounted to the frame, and a second scale system positioned beneath the second storage tank, wherein in a first position, the second storage tank exerts a force against the second scale system, and wherein in a second position, the second end of the second lever exerts a force on a bottom surface of the second storage tank such that the second storage tank is positioned above, and out of contact with, the second scale system, when the second storage tank is in the second position.

Viewed from another aspect, an example embodiment takes the form of a method. The method includes steps of (i) providing a first storage tank, and a frame positioned at least partially beneath the first storage tank, and a first lever having a first end and a second end, and the first lever is pivotally mounted to the frame; and a first scale system positioned beneath the first storage tank; wherein in a first position, the first storage tank exerts a force against the first scale system, and in a second position, the second end of the first lever exerts a force on a bottom surface of the first storage tank such that the first storage tank is positioned above, and out of contact with, the first scale system, when the first storage tank is in the second position, and (ii) moving the first storage tank from the first position wherein the first storage tank exerts a force on the first scale system to the second position where the first storage tank is positioned above, and out of contact with, the first scale system.

The method may further provide that the step of moving the first storage tank from the first position to the second position comprises moving the first end of the first lever such that the second end of the first lever exerts the force against the bottom surface of the first storage tank; and further includes the step of positioning the first end of the first lever underneath a notch in a boundary of an aperture in a first side wall to lock the first end of the first lever and first storage tank into the locked position.

The method may also further include the steps of (iii) providing a second storage tank, and a second lever having a first end and a second end, and the second lever pivotally mounted to the frame, and a second scale system positioned beneath the second storage tank, wherein in a first position, the second storage tank exerts a force against the second scale system, and in a second position, the second end of the second lever exerts a force on a bottom surface of the second storage tank such that the second storage tank is positioned above, and out of contact with, the second scale system, when the second storage tank is in the second position; and (iv) moving the second storage tank from the first position wherein the second storage tank exerts a force on the second scale system to the second position where the second storage tank is positioned above, and out of contact with, the second scale system.

These as well as other aspects and advantages will become apparent to those of ordinary skill in the art by reading the following detailed description, with reference to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

DETAILED DESCRIPTION

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise.

The diagrams, flow charts, and data shown in the figures are provided merely as examples and are not intended to be limiting. Many of the elements illustrated in the figures and/or described herein are functional elements that can be implemented as discrete or distributed elements, individually or in conjunction with other element(s), and in any suitable combination and/or location. Those skilled in the art will appreciate that other arrangements and elements can be used instead. Furthermore, the functions described as being performed by one or more elements can be carried out by a combination of hardware, firmware, and/or software (e.g., a processor that executes computer-readable program instructions).

Figure 1:
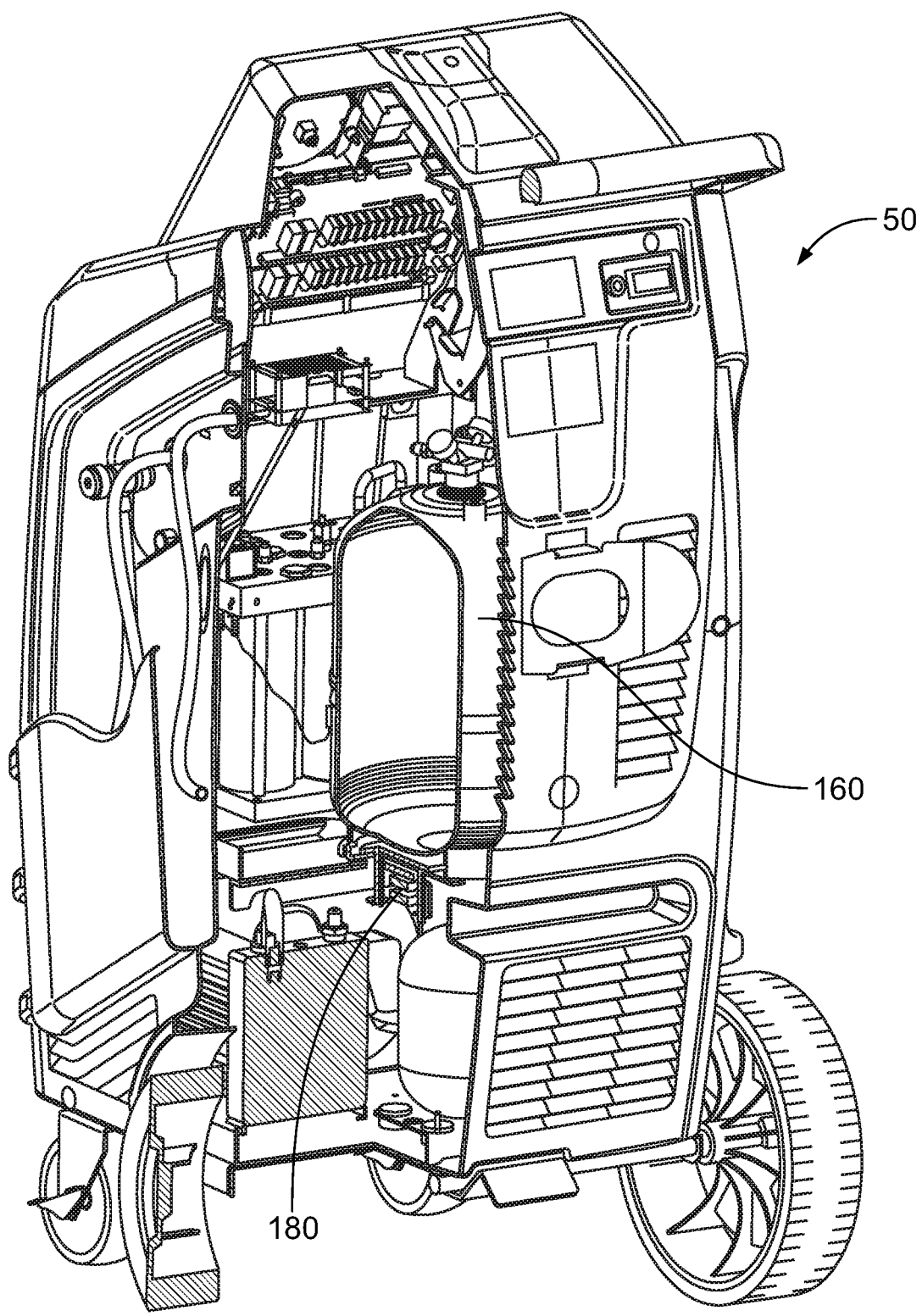
FIG. 1 is a partial cut-away perspective view of refrigerant recovery and delivery unit 50 having a storage tank positioned on top of a scale system.

FIG. 1 is a partially cut-away perspective view showing an apparatus 50, which in some embodiments may be a refrigerant recovery and delivery unit. In this embodiment, storage tank 160 is positioned within the refrigerant recovery and delivery unit. The apparatus 50 can be configured to weigh a storage tank 160 and contents thereof, using a scale system 180, which may be a load cell, although other types of scales may also be used.

In some cases, the storage tank 160 and scale system 180 can be prone to vibration or movement during transportation of the refrigerant recovery and delivery unit from one location to another. In addition, if the vehicle transporting the storage tank and scale system within the refrigerant recovery and delivery system encounters a bumpy ride, the storage tank and scale system can be jostled or experience jolts. These conditions can lead to damage inflicted on the scale system. For example, under these conditions, the storage tank can impact a load cell within the scale system, thereby damaging the load cell.

Figure 2:
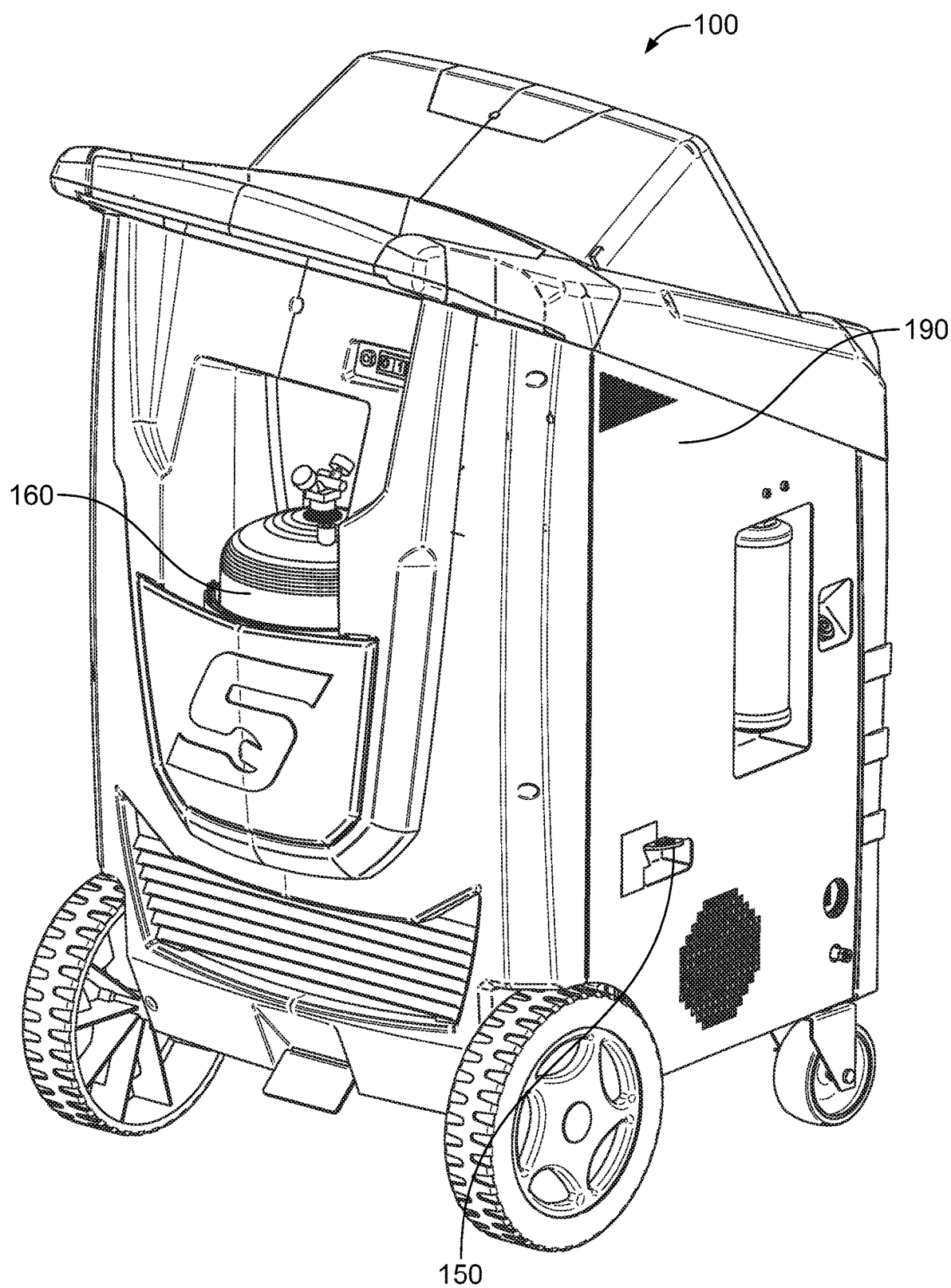
FIG. 2 is a perspective view of refrigerant recovery and delivery unit 100, according to an example embodiment.

FIG. 2 is a perspective view of refrigerant recovery and delivery unit 100, according to an example embodiment. Refrigerant recovery and delivery unit 100 includes a storage tank 160 and a lever 150 extending through side wall 190.

Figure 3A:
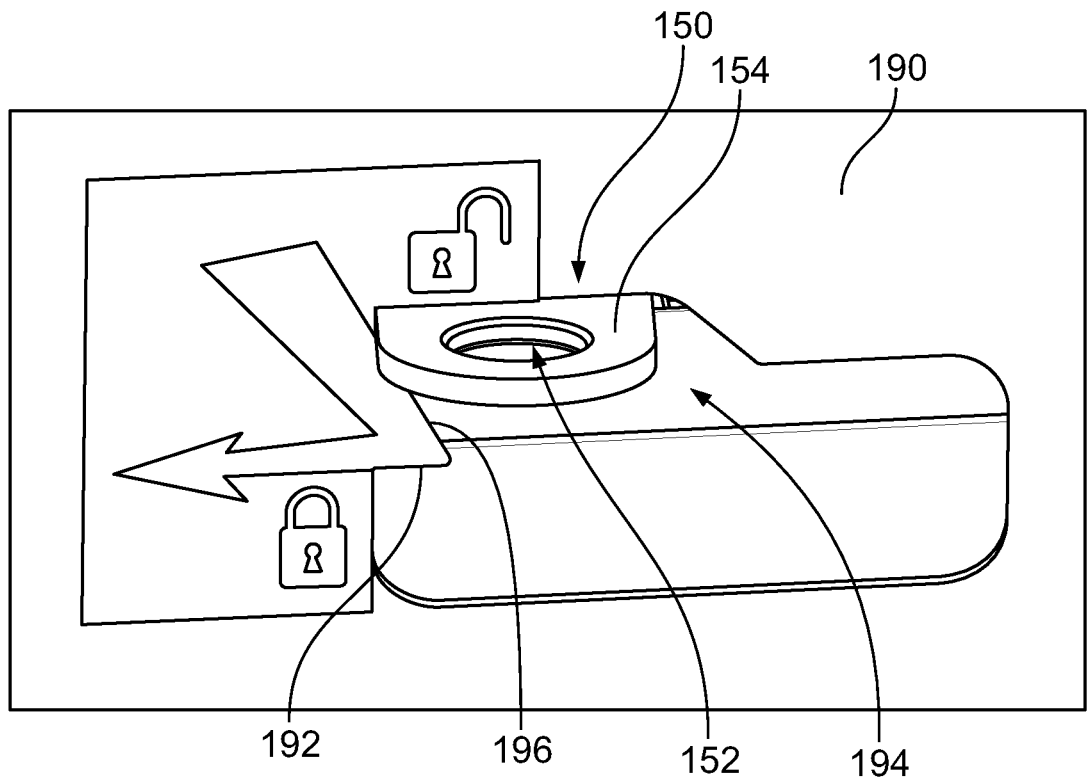
FIG. 3A is a close up perspective view of refrigerant recovery and delivery unit 100 shown in FIG. 2 having a lever 150 movable for moving a storage tank within unit 100 from an unlocked to a locked position, with the lever shown in the unlocked position, according to an example embodiment.

FIG. 3A is a close up view of a first end 154 of lever 150 extending through side wall 190. In this embodiment, lever 150 includes a first end 154 having an aperture 152, and is shown with lever 150 in a first, unlocked position. In the first, unlocked position shown in FIG. 3A, the storage tank positioned within the refrigerant recovery and delivery unit is positioned over a load cell and exerts a force on the load cell, such that the contents of the storage tank may be weighed. The lever 150 in this embodiment includes a spring positioned about a pivot bolt that biases the lever 150 to the left. To move the handle 150 into a second, locked position, a user grasps the first end 154 of lever 150, and may place a thumb within aperture 152 to better grip the first end 154 of lever 150. The first end 154 of lever 150 is then moved downwardly along sloped wall 196 of aperture 194 in side wall 190. Once the first end 154 of lever 150 extends beneath the sloped wall 196, the first end 154 of lever 150 is moved underneath notch 192 that forms part of the boundary of aperture 194 in side wall 190. A spring on a pivot bolt biases the first end 154 of lever 150 toward the left beneath notch 192 of aperture 194 of side wall 190. Once positioned beneath the notch 192, the first end 154 of lever 150 is in the second, locked position, and a second end of the lever 150 has been raised to exert a force on a bottom surface of the storage tank to raise the storage tank above, and out of contact with, the load cell, to prevent damage that may be caused to the load cell during transportation of the refrigerant recovery and delivery unit.

Figure 3B:
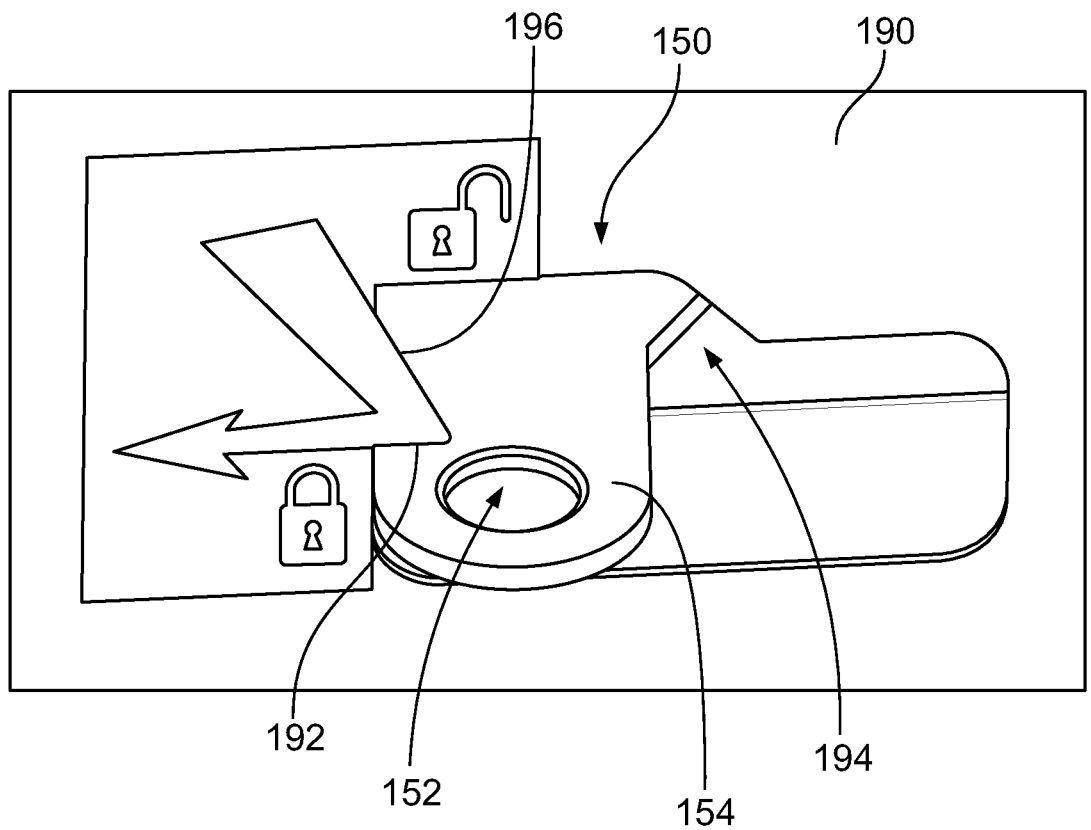
FIG. 3B is a close up perspective view of refrigerant recovery and delivery unit 100 shown in FIG. 3A having a lever 150 movable for moving a storage tank within unit 100 from an unlocked to a locked position, with the lever shown in the locked position, according to an example embodiment.

FIG. 3B is a close up view of first end 154 of lever 150 extending through side wall 190, with lever 150 shown in a second, locked position. In the embodiment of FIG. 3B, the first end 154 of lever 150 has been moved downwardly along sloped wall 196 of aperture 194 of side wall 190 and positioned beneath notch 192 of aperture 194. A spring on a pivot bolt biases the first end 154 of lever 150 to the left so that it is maintained in the second, locked position. In the second, locked position, with the first end 154 of lever 150 positioned beneath notch 192, a second end of the lever 150 has been moved upwardly to exert a force on a bottom surface of the storage tank to raise the storage tank above, and out of contact with, the load cell, to prevent damage that may be caused to the load cell during transportation of the refrigerant recovery and delivery unit. In this manner, during transportation when the refrigerant recovery and delivery unit experiences a bumpy ride, vibration, jostling, and/or jolting, etc., with the storage tank in the second, locked position, the storage tank is positioned above, and out of contact with, the scale system, thereby preventing damage to the scale system during transportation. The lever 150 remains in the second, locked position until a user exerts a force greater than the spring force applied to the lever 150 to move the lever towards the right along notch 192, until the lever extends to the right of the notch 192 where the lever moves upwardly along sloped wall 196 of aperture 194 and into the first, unlocked position.

Figure 4A:
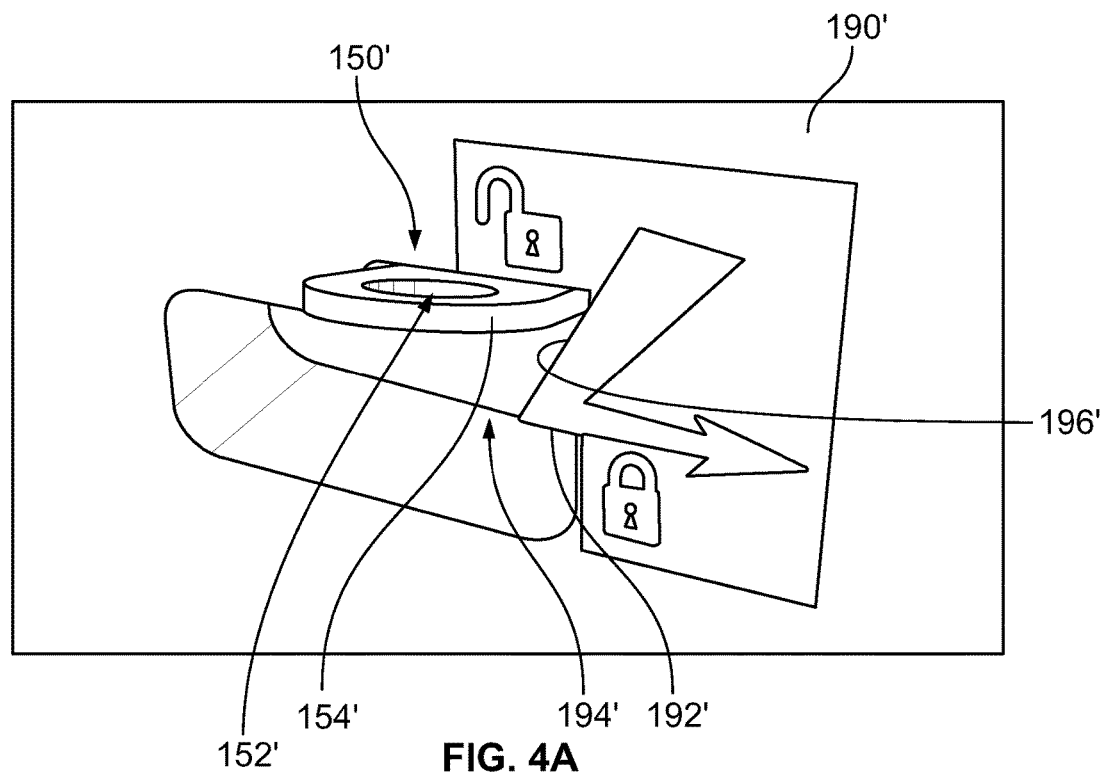
FIG. 4A is a close up perspective view of refrigerant recovery and delivery unit 100 having a lever 150' for moving a storage tank within unit 100 from an unlocked to a locked position, with the lever shown in the unlocked position, according to an example embodiment.

A second lever may extend through a second side wall of the refrigerant recovery and delivery unit that may be used to move a second storage tank into a second, locked position where the storage tank is raised above, and out of contact with, a second load cell positioned within the refrigerant recovery and delivery unit. FIG. 4A is a close up view of a first end 154' of lever 150' extending through side wall 190' that may be positioned on an opposite side (or adjacent side) of side wall 190 shown in FIGS. 3A and 3B. Alternately, the lever 150' may be positioned in side wall 190, along with lever 150, such that two levers extend from a single side wall of the refrigerant recovery and delivery unit (see example embodiment in FIG. 11), which are used to lift two storage tanks into a second, locked position with the storage tanks positioned above, and out of contact with, respective load cells positioned within the refrigerant recovery and delivery unit.

It will be appreciated that once the refrigerant recovery and delivery unit has been transported to a destination for use, the lever 150 can be moved rightward from the second, locked position shown in FIG. 3B until the first end 154 extends beyond the notch 192 and then moves upwardly along the sloped wall 196 until the lever 150 is in the first, unlocked position as shown in FIG. 3A.

In FIG. 4A, lever 150' includes a first end 154' having an aperture 152', and is shown with lever 150' in a first, unlocked position. In the first, unlocked position shown in FIG. 4A, the storage tank positioned within the refrigerant recovery and delivery unit is positioned over a load cell and exerts a force on the load cell, such that the contents of the storage tank may be weighed. The lever 150' in this embodiment includes a spring positioned about a pivot bolt that biases the lever 150' to the right. To move the handle 150' into a second, locked position, a user grasps the first end 154' of lever 150', and may place a thumb within aperture 152' to better grip the first end 154' of lever 150'. The first end 154' of lever 150' is then moved downwardly along sloped wall 196' of aperture 194' in side wall 190'. Once the first end 154' of lever 150' extends beneath the sloped wall 196', the first end 154' of lever 150 is moved underneath notch 192' of aperture 194' in side wall 190'. A spring on a pivot bolt biases the first end 154' of lever 150' toward the right beneath notch 192' of aperture 194' of side wall 190'. Once positioned beneath the notch 192', the first end 154' of lever 150' is in the second, locked position, and a second end of the lever 150' has been raised to exert a force on a bottom surface of a second storage tank to raise the second storage tank above, and out of contact with, a second load cell, to prevent damage that may be caused to the second load cell during transportation of the refrigerant recovery and delivery unit.

Figure 4B:
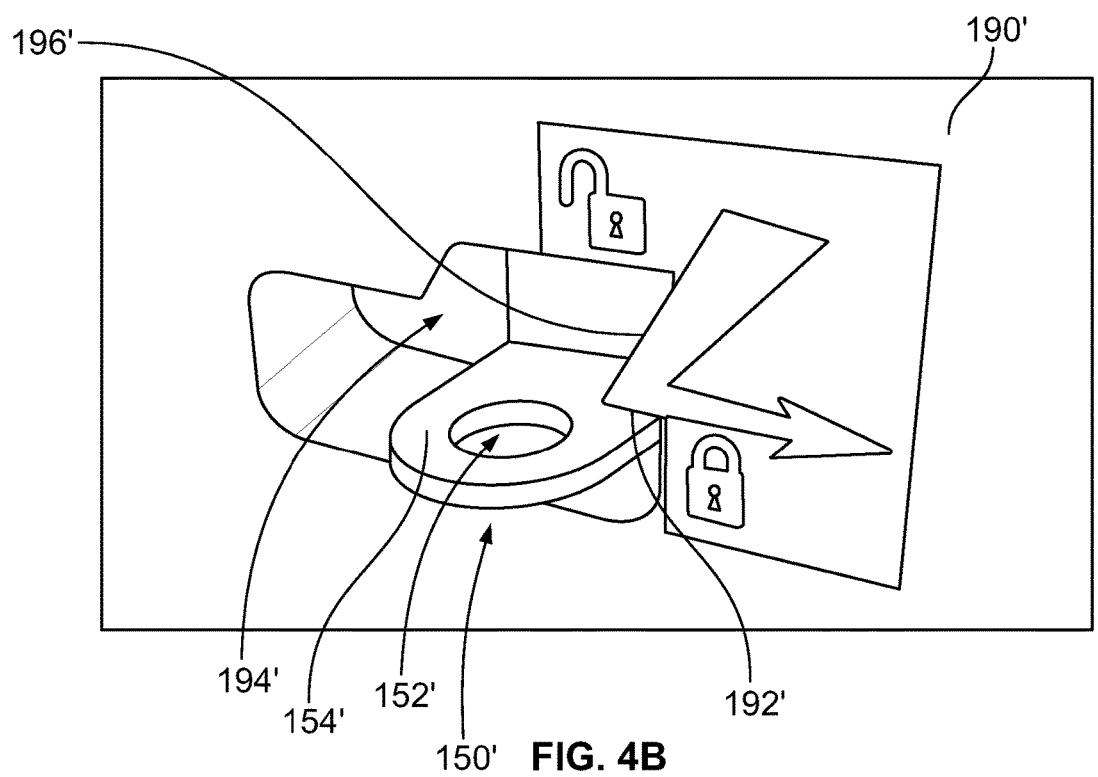
FIG. 4B is a close up perspective view of refrigerant recovery and delivery unit 100 shown in FIG. 4A having a lever 150' for moving a storage tank within unit 100 from an unlocked to a locked position, with the lever shown in the locked position, according to an example embodiment

FIG. 4B is a close up view of first end 154' of lever 150' extending through side wall 190', with lever 150' shown in a second, locked position. In the embodiment of FIG. 4B, the first end 154' of lever 150' has been moved downwardly along sloped wall 196' of aperture 194' of side wall 190' and positioned beneath notch 192' of aperture 194'. A spring on a pivot bolt biases the first end 154' of lever 150' to the right so that it is maintained in the second, locked position. In the second, locked position, with the first end 154' of lever 150' positioned beneath notch 192', a second end of the lever 150' has been moved upwardly to exert a force on a bottom surface of the second storage tank to raise the second storage tank above, and out of contact with, the second load cell, to prevent damage that may be caused to the second load cell during transportation of the refrigerant recovery and delivery unit.

Figure 12:
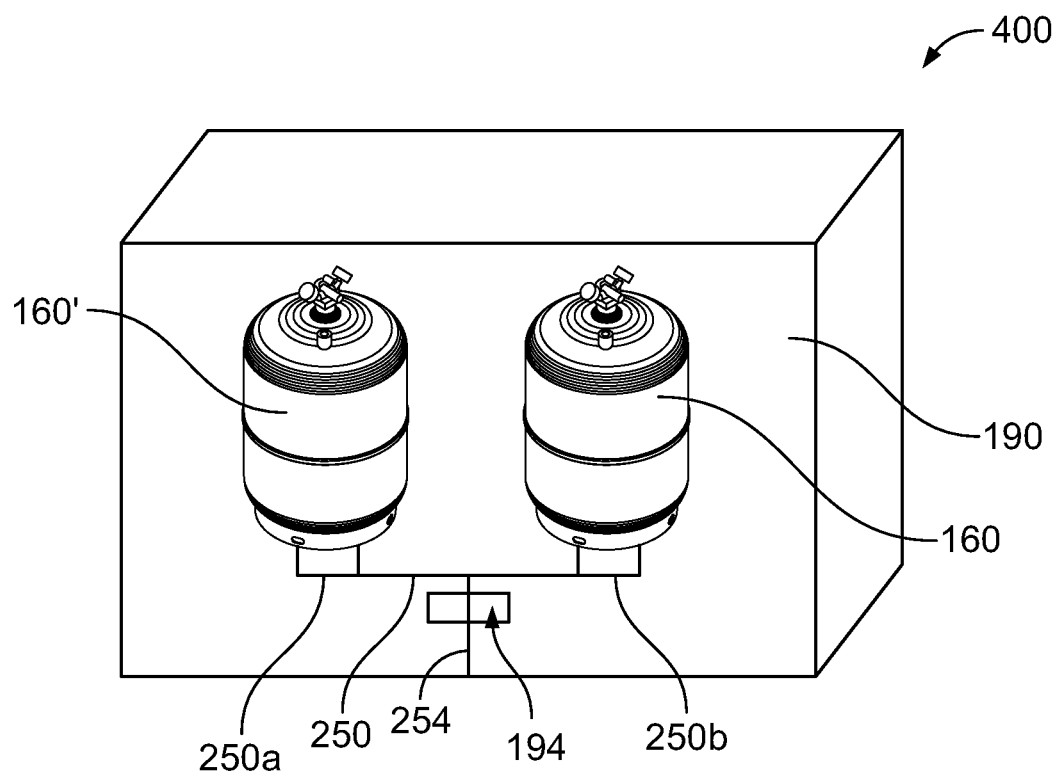
FIG. 12 is a perspective view of refrigerant recovery and delivery unit 400 shown with storage tanks 160 and 160' and a single lever opening 194' positioned in wall 190 and lever 250 having two branched portions 250a and 250b adapted to raise tanks 160 and 160' into a locked position, according to an example embodiment.

It will also be appreciated, that in some embodiments, a single lever may be used to raise two separate storage tanks (see example embodiment in FIG. 12). For example, a single lever may have a first end that is manipulated by a user to move the lever from a first, unlocked position to a second, locked position, where the second end of the lever branches off from the lever to extend beneath a first storage tank and a second storage tank. When the lever is moved to the second, locked position, the second end of the lever exerts a force on bottom surfaces of both the first and second storage tanks to raise them into position above, and out of contact with, respective load cells positioned within a refrigerant recovery and delivery unit.

It will further be appreciated that once the refrigerant recovery and delivery unit has been transported to a destination for use, the lever 150' can be moved leftward from the second, locked position shown in FIG. 4B until the first end 154' extends beyond the notch 192' and then moves upwardly along the sloped wall 196' until the lever 150' is in the first, unlocked position as shown in FIG. 4A.

Figure 5:
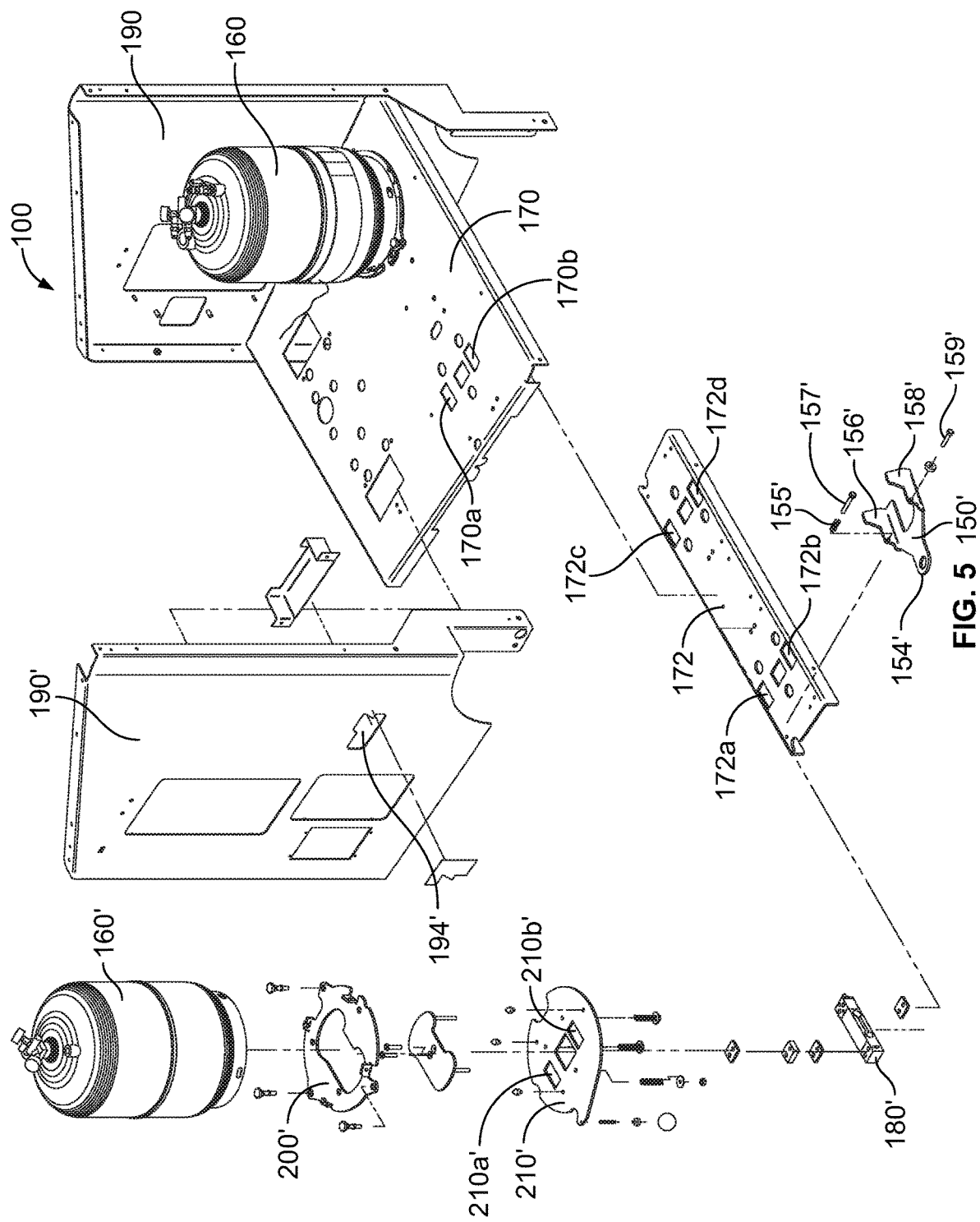
FIG. 5 is an exploded view of the components of the refrigerant recovery and delivery unit 100 shown in FIGS. 2-4B.

FIG. 5 is an exploded view of the internal components of refrigerant recovery and delivery unit 100 shown in FIGS. 2-4B. The internal components include storage tank 160 and storage tank 160'. In some embodiments, the storage tanks 160 and 160' can be configured to store refrigerant, such as refrigerant used in air-conditioning systems in vehicles (e.g., industry standard refrigerants like dichlorodifluoromethane—R-12, chlorodifluoromethane—R-22, 1,1,1,2-tetrafluoroethane—R-134a, etc.). The refrigerant stored within the storage tanks 160 and 160' can be a liquid, a gas, or a combination of the two, in various embodiments. In one example embodiment, the storage tanks 160 and 160' have a 30 lb. (13.6 kg) rated refrigerant capacity. The storage tanks 160 and 160', when empty, can have a weight between 15-17 lb. (6.8-7.7 kg) In another example embodiment, the storage tanks 160 and 160' have a 50 lb. (22.7 kg) rated refrigerant capacity and an empty weight between 28-32 lb. (12.7-14.5 kg). Various other storage tank sizes and capacities are possible (e.g., 24 lb., 10.9 kg, rated refrigerant capacity storage tank). In other embodiments, the storage tanks 160 and 160' may store gas and/or liquid other than a refrigerant, and storage tanks 160 and 160' may be of different weights and sizes.

The refrigerant within the storage tanks 160 and 160' can be stored during a refrigerant recovery process, a refrigerant recycling process, or a refrigerant reintroduction process, in various embodiments. Further, the refrigerant recovery process, recycling process, or reintroduction process can include multiple phases or stages (e.g., one phase that withdraws refrigerant from, or adds refrigerant to, a vehicle using a compressor and a second phase that withdraws refrigerant from a vehicle using a compressor aided by a vacuum pump). In addition, the storage tanks 160 and 160' may also store refrigerant when not in use with respect to a vehicle.

A tank plate 200' is positioned beneath the bottom of the storage tank 160' and may be secured to the bottom of the storage tank via clips, set screws, strap(s), etc. A base plate 210' is positioned beneath the tank plate 200'. The storage tank 160', tank plate 200', and base plate 210' are positioned above frame 170 which includes a frame reinforcement 172. A scale system 180' in the form of a load cell is positioned within the frame 170, and scale spacers are also shown. A tank plate, base plate, and scale system may be positioned underneath storage tank 160.

A lever 150' is shown that is pivotally mounted to frame reinforcement 172, the lever 150' having a first end 154' that extends through aperture 194' of side wall 190'. The lever 150' includes first end 154' and a second end having upwardly extending flanges 156' and 158' that extend through slots 172a and 172b of frame reinforcement 172, as well as through slots 170a and 17b of frame 170, and slots 210a' and 210b' in base plate 210'. The upwardly extending flanges 156' and 158' on lever 150' engage a bottom of tank plate 200' when the first end 154' of lever 150' is moved downwardly, to lift storage tank 160' above, and out of contact with, scale system 180' when the storage tank 160' is moved to the locked position. Pivot bolts 157' and 159' are used to pivotally mount lever 150' with frame enforcement 172. A single bolt could also be used. A spring 155' is positioned about bolt 157' to bias lever 150' towards the right into a locked position. A lever constructed the same as lever 150' may extend through side wall 190 and be used to raise storage tank 160 into a locked position, above and out of contact with, a load cell positioned beneath storage tank 160. Upwardly extending flanges on the lever extending through side wall 190 may extend through slots 172c and 172d of frame reinforcement 172, as well as through corresponding slots in frame 170 and a base plate positioned beneath storage tank 160.

Figure 6:
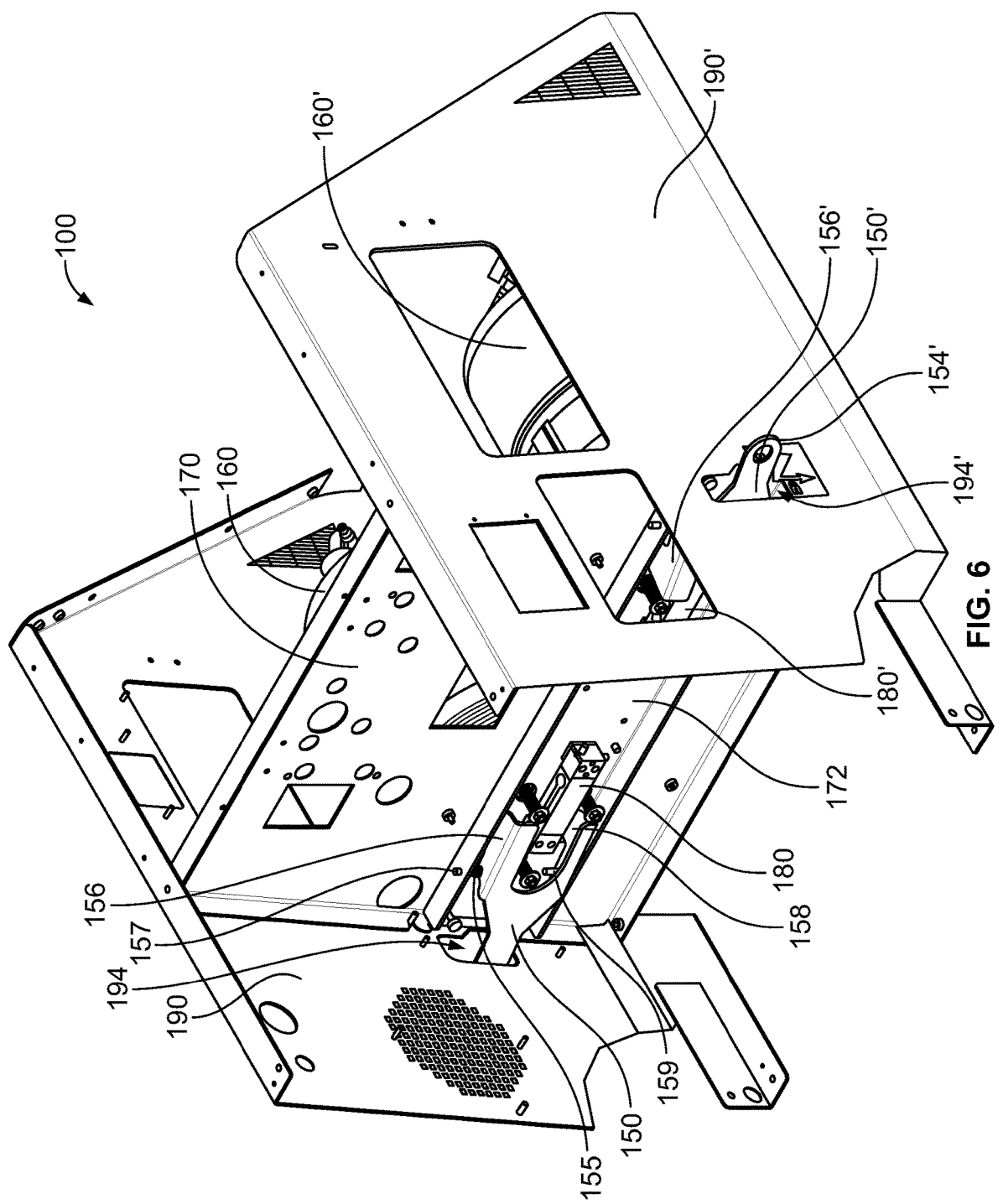
FIG. 6 is a perspective, bottom view of refrigerant recovery and delivery unit 100 shown in FIGS. 2-5, with portions removed, according to an example embodiment.

FIG. 6 is a perspective underneath view of refrigerant recovery and delivery unit 100 shown in FIGS. 2-5 with portions removed to show the internal components. In FIG. 6, the storage tank 160 is shown in the locked position with upwardly extending flanges 156 and 158 of lever 150 exerting an upward force (transmitted through a tank plate not shown) on a bottom surface of storage tank 160 to position storage tank 160 above, and out of contact with, scale system 180. The first end of lever 150 is shown extending through aperture 194 in side wall 190, and lever 150 pivotally mounted to frame reinforcement 172 of frame 170 with pivot bolts 157 and 159. Spring 155 positioned about pivot bolt 157 biases the first end of the lever towards the right in the locked position. First end 154' of lever 150' is shown extending through aperture 194' of sidewall 190', and lever 150' and upwardly extending flange 156' are shown with the lever 150' in an unlocked position with storage tank 160' exerting a force on scale system 180'.

In some embodiments scale systems 180 and 180' may be a load cell, while in other embodiments the scale system could be a different type of scale such as a spring scale. When a load cell is used for scale system 180, the load cell is configured to measure force acting on the load cell. This force may be output as an electrical signal, in some embodiments. The electrical signal could be sent to a processing device or a control system, for example. Alternatively or additionally, the force could be output to a display for viewing by a user of the refrigerant recovery and delivery unit 100. The force measured by the load cells could correspond to the weight applied to the respective load cells by the storage tanks 160 and 160' and contents therein. After accounting for the weight of an empty storage tank, the force measured by the load cells can correspond to the amount (weight) of refrigerant in the storage tanks 160 and 160', respectively.

Various types of load cells may be used for scale systems 180 and 180'. Some example load cells include strain gauge load cells (e.g., shear beam load cells, double-ended shear beam load cells, or compression load cells), hydraulic load cells, and pneumatic load cells. The load cell can be a transducer in multiple embodiments, whereby a voltage or a current output signal indicates a value of a corresponding force acting on the load cell.

Figure 7:
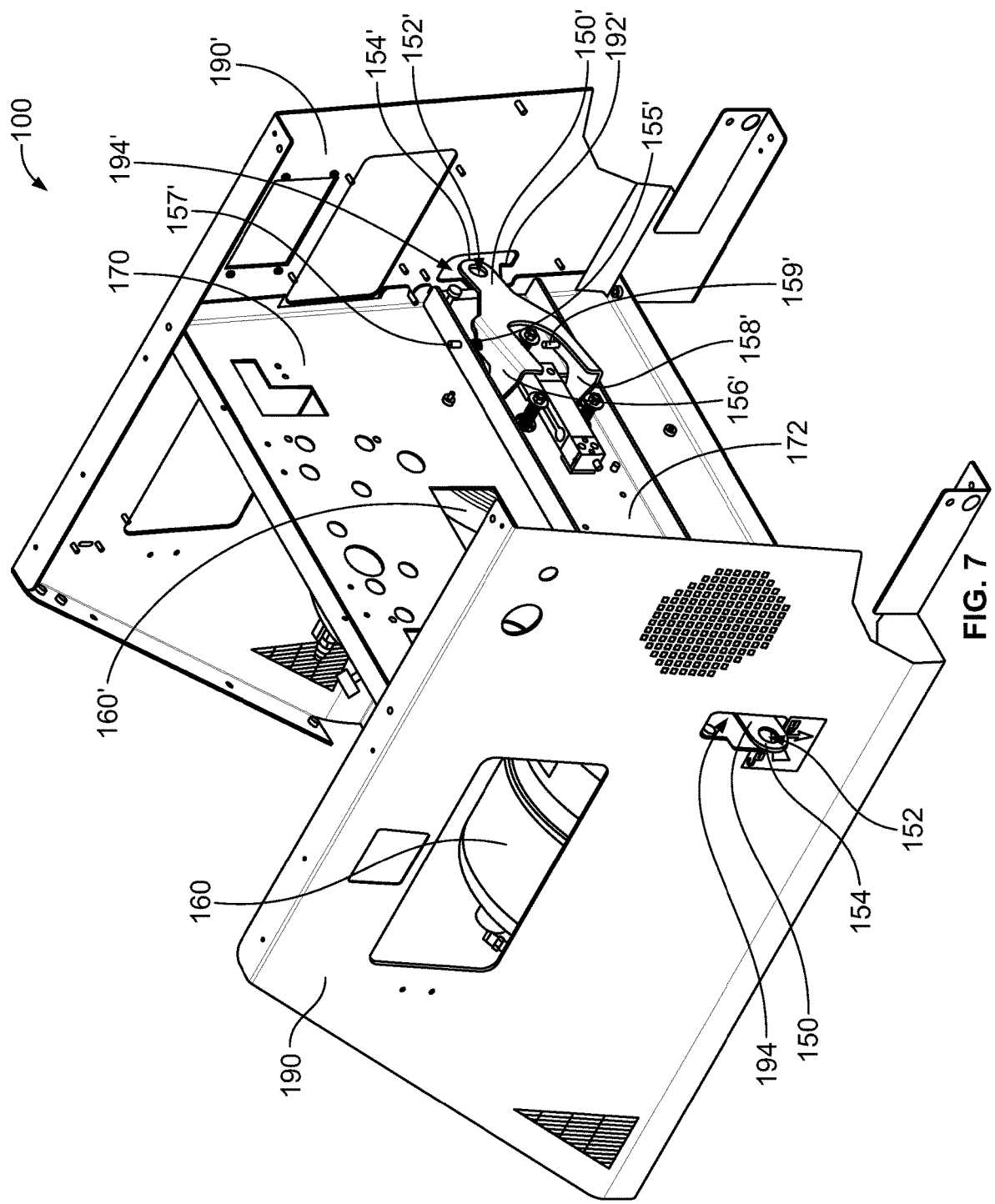
FIG. 7 is another perspective, bottom view of refrigerant recovery and delivery unit 100 shown in FIG. 6, with portions removed, according to an example embodiment.

FIG. 7 is another underneath perspective view of refrigerant recovery and delivery unit 100 shown in FIG. 6. In FIG. 7, the storage tank 160' is shown in the unlocked position with upwardly extending flanges 156' and 158' of lever 150' not exerting an upward force on a bottom surface of storage tank 160' (or tank plate 200'), such that storage tank 160' is positioned over and exerts a force on scale system 180'. The first end 154' with aperture 152' positioned therein of lever 150' is shown extending through aperture 194' in side wall 190' and not positioned beneath notch 192' of aperture 194' in this unlocked position. Lever 150' is pivotally mounted to frame reinforcement 172 of frame 170 with pivot bolts 157' and 159', and although not in the locked position, spring 155' positioned about pivot bolt 157' biases lever 150' towards the right of aperture 194' of side wall 190'. First end 154 having aperture 152 of lever 150 is shown extending through aperture 194 of sidewall 190, and lever 150 is shown positioned in the locked position with storage tank 160 positioned above, and out of contact with, a load cell positioned beneath frame reinforcement 172.

Figure 8A:
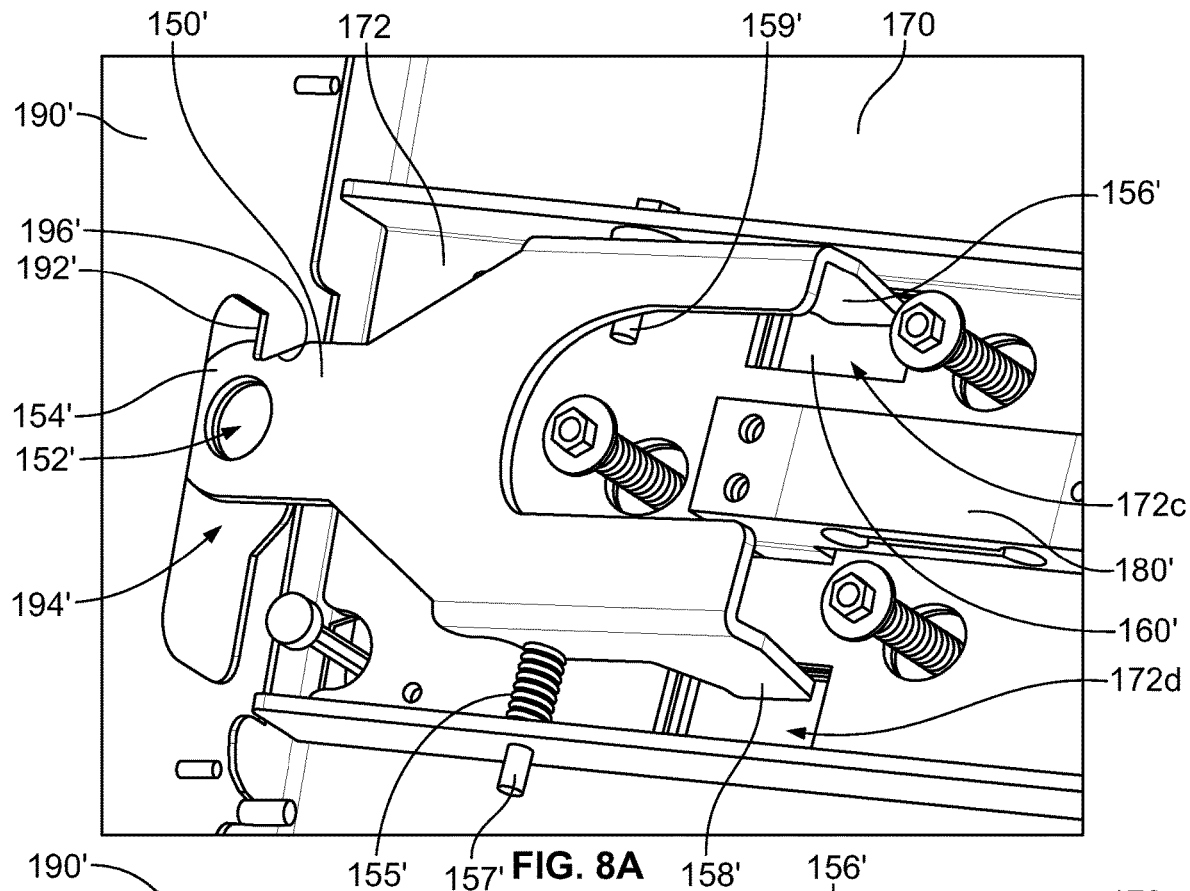
FIG. 8A is a close up perspective, bottom view of a portion of refrigerant recovery and delivery unit 100 shown in FIG. 6, shown with lever 150 in an unlocked position, according to an example embodiment.

FIG. 8A is a close up perspective view of refrigerant recovery and delivery unit 100 shown in FIG. 7, with lever 150' and storage tank 160' shown in an unlocked position. In FIG. 8A, the storage tank 160' is shown in the unlocked position with upwardly extending flanges 156' and 158' of lever 150' that extend through slots 172c and 172d of frame reinforcement 172 of frame 170 not exerting an upward force on a bottom surface of storage tank 160' or tank plate 200', such that storage tank 160' exerts a force on scale system 180'. The first end 154' having aperture 152' of lever 150' is shown extending through aperture 194' in side wall 190' positioned above notch 192' and sloped wall 196', and lever 150' is pivotally mounted to frame reinforcement 172 of frame 170 with pivot bolts 157' and 159'. Spring 155' positioned about pivot bolt 157' biases the first end 154' of the lever 150' towards the right side of aperture 194' of side wall 190'.

Figure 8B:
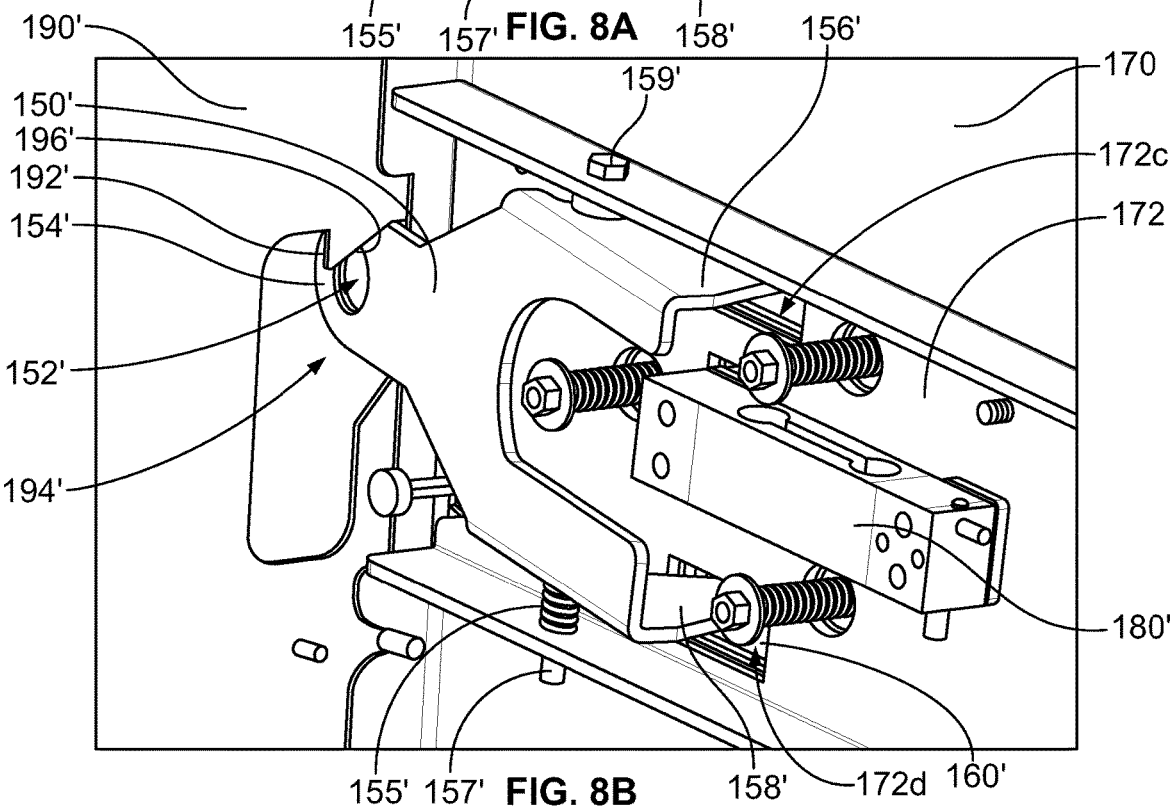
FIG. 8B is a another close up perspective, bottom view of a portion of refrigerant recovery and delivery unit 100 shown in FIG. 8A, shown with lever 150 in an unlocked position, according to an example embodiment.

FIG. 8B is another close up perspective view of refrigerant recovery and delivery unit 100 shown in FIG. 8A, with lever 150' and storage tank 160' shown in an unlocked position. In FIG. 8B, the storage tank 160' is shown in the unlocked position with upwardly extending flanges 156' and 158' of lever 150' that extend through slots 172c and 172d of frame reinforcement 172 of frame 170 not exerting an upward force on a bottom surface of storage tank 160' or tank plate 200', such that storage tank 160' exerts a force on scale system 180'. The first end 154' having aperture 152' of lever 150' is shown extending through aperture 194' in side wall 190' positioned above notch 192' and sloped wall 196', and lever 150' is pivotally mounted to frame reinforcement 172 of frame 170 with pivot bolts 157' and 159'. Spring 155' positioned about pivot bolt 157' biases the first end 154' of the lever 150' towards the right side of aperture 194' of side wall 190'.

Figure 9:
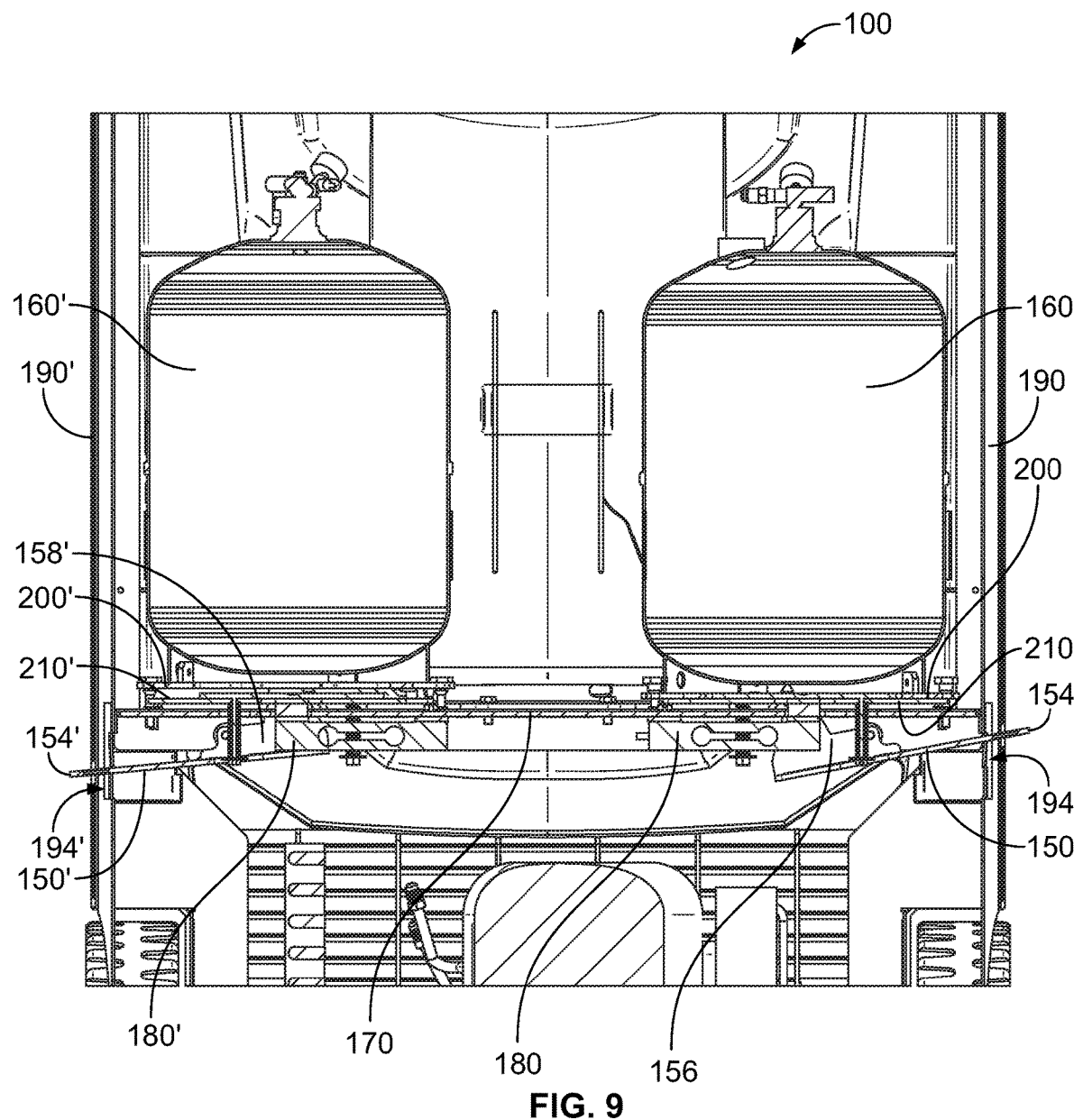
FIG. 9 is a cut-away side view of refrigerant recovery and delivery apparatus 100, shown with storage tanks 160 and 160', with storage tank 160 shown in an unlocked position and storage tank 160' shown in a locked position, according to an example embodiment.

FIG. 9 is a partial cross-sectional view of refrigerant recovery and delivery unit 100 shown in FIGS. 2-8B. On the left side, storage tank 160' is shown positioned above tank plate 200' and base plate 210', as well as frame 170 and scale system 180'. A first end 154' of lever 150' is shown extending through aperture 194' of side wall 190'. Storage tank 160' and lever 150' are shown in a locked, raised position with upwardly extending flange 158' of lever 150 exerting an upward force on tank plate 200' and in turn a bottom surface of storage tank 160' such that storage tank 160' is raised into position above, and out of contact with, base plate 210' and scale system 180'. On the right side of FIG. 9, storage tank 160 is shown positioned above tank plate 200 and base plate 210, as well as frame 170 and scale system 180. A first end 154 of lever 150 is shown extending through aperture 194 of side wall 190. Storage tank 160 and lever 150 are shown in an unlocked position with upwardly extending flange 156 not exerting a force against tank plate 200 or a bottom surface of storage tank 160, such that storage tank exerts a force against scale system 180.

Figure 10A:
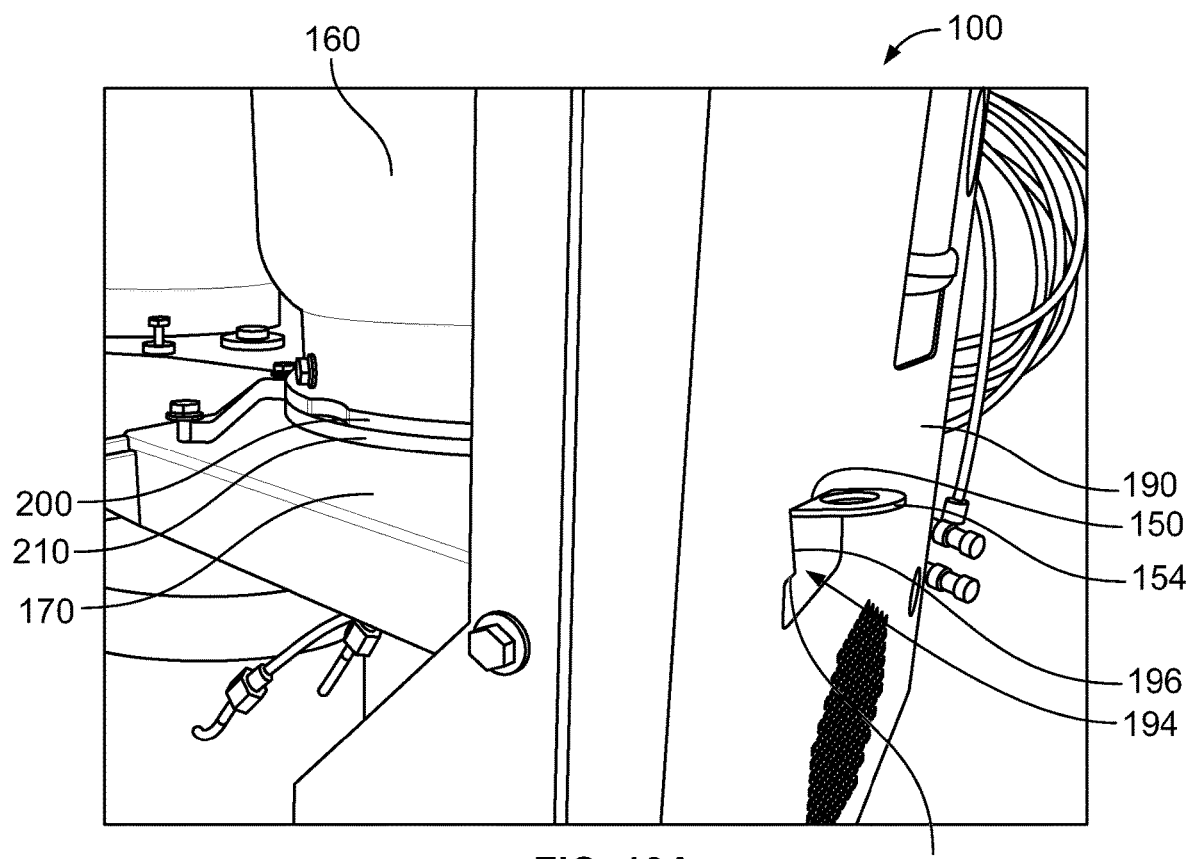
FIG. 10A is a perspective view of tank 160 and lever 150 shown with tank 160 and lever 150 in an unlocked position, according to an example embodiment.

FIG. 10A is a perspective view of refrigerant recovery and delivery unit 100. Storage tank 160 is shown positioned above tank plate 210, base plate 200, and frame 170. A first end 154 having aperture 152 of lever 150 is shown extending through aperture 194 of side wall 190. Lever 150 and storage tank 160 are shown in a first, unlocked position with storage tank exerting a force against a scale system (not shown) positioned beneath frame 170.

Figure 10B:
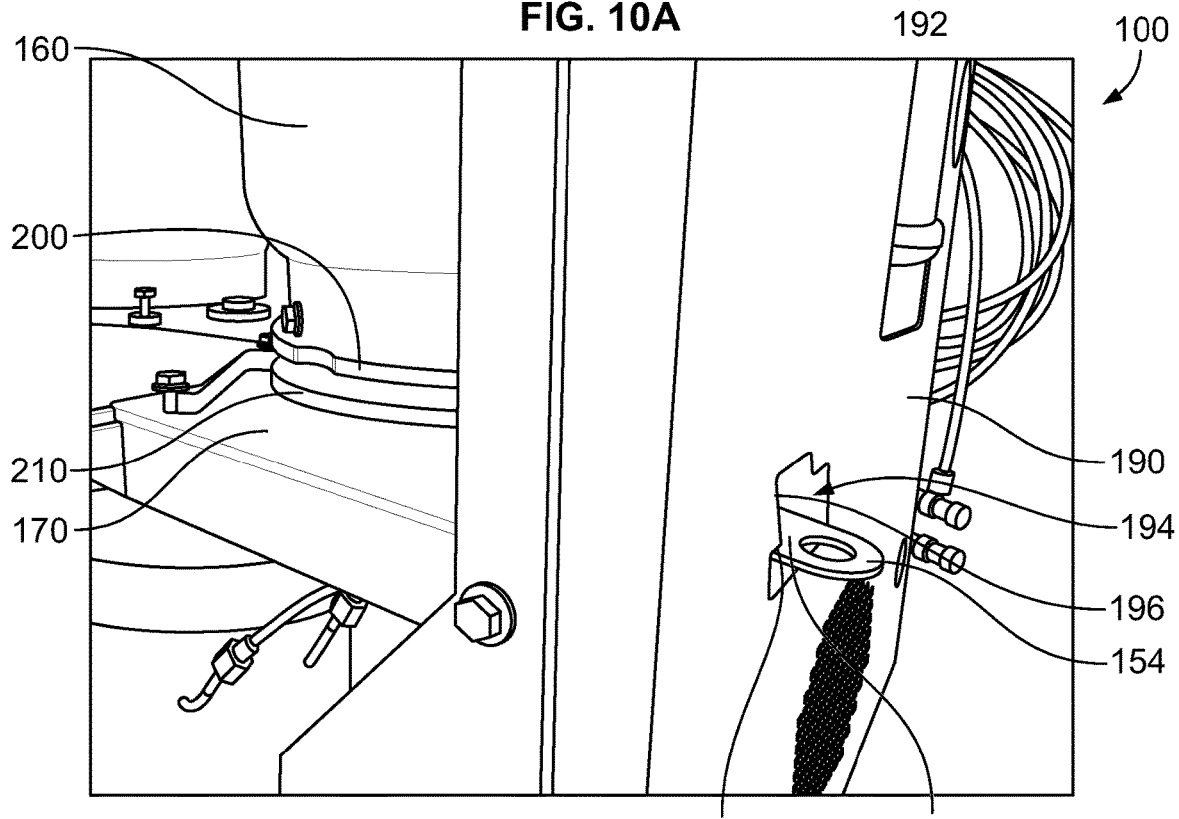
FIG. 10B is a perspective view of tank 160 and lever 150 shown with tank 160 and lever 150 in a locked position, according to an example embodiment.

FIG. 10B is a perspective view of refrigerant recovery and delivery unit 100 after lever 150 and storage tank 160 have been moved into a second, locked position with storage tank 160 raised upwardly into a position where storage tank 160 is positioned above, and out of contact with, the load cell positioned beneath frame 170. The first end 154 of lever 150 extends through aperture 194 in side wall 190. To move the lever 150 and storage tank to the second raised position, a user grasps first end 154 of lever 150 and may place a thumb or finger within aperture 152 on first end 154 of lever 150 to provide a better grip. First end 154 of lever 150 is moved downwardly along sloped wall 196 of aperture 194 in side wall 190 and the first end 154 is then moved to the left into position underneath notch 192 in side wall 190 to lock the first end 154 of lever 150 into a locked position. At the same time, the storage tank 160 and tank plate 210 is raised above, and out of contact with, base plate 200, frame 170, and a scale system (not shown). A spring is used to bias the first end 154 of lever 150 into the locked position beneath notch 192 of side wall 190.

Figure 13:
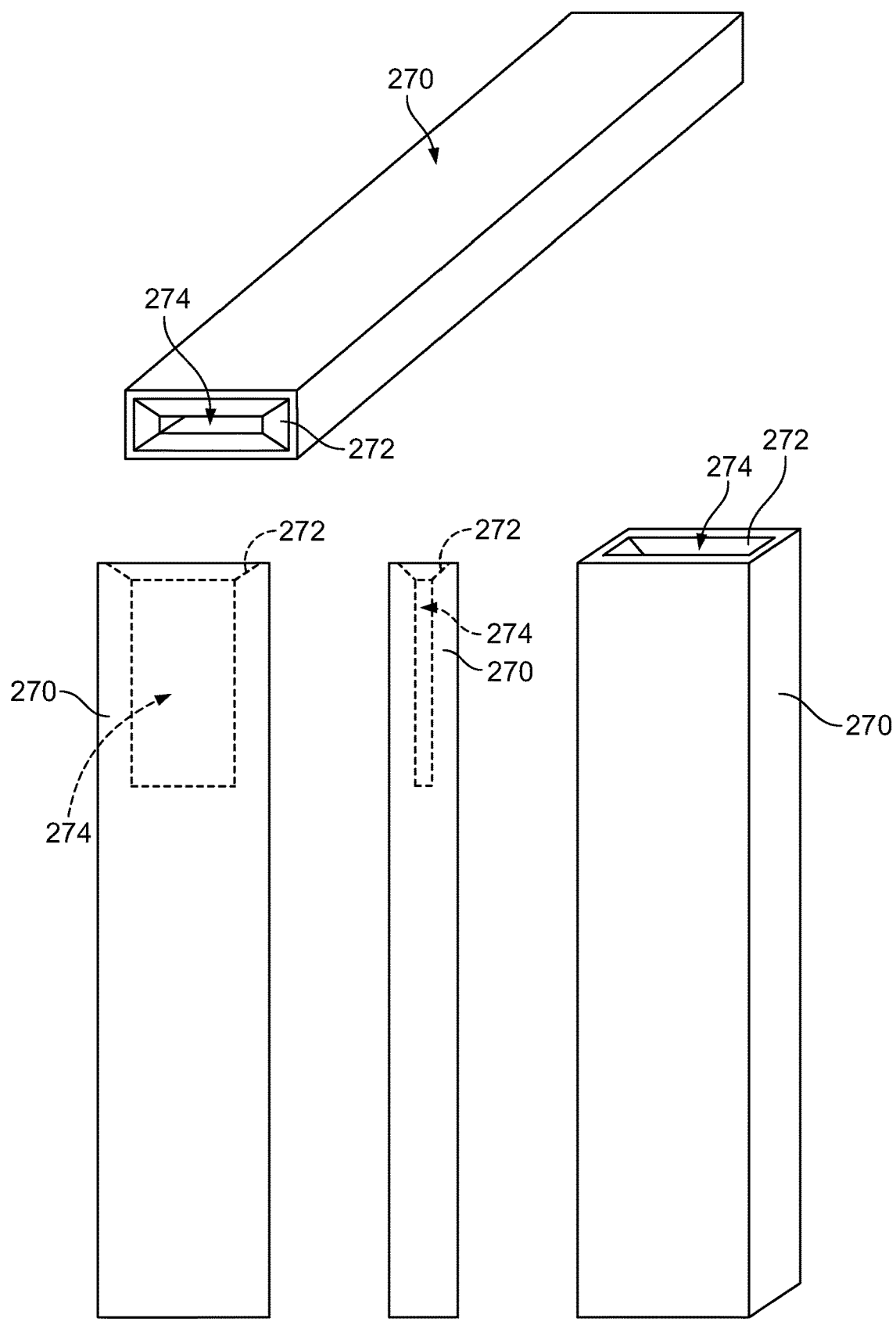
FIG. 13 shows multiple view of lever extension 270, according to an example embodiment.

It will be appreciated that in some embodiments tank plate 200 is not required, and the lever 150 could exert a force directly on the bottom of storage tank 160, or a reinforced bottom of storage tank 160, rather than exert a force on the bottom of storage tank 160 through tank plate 200. In addition, in some embodiments, the lever 150 may include additional upwardly extending flanges, may include only a single flange, or may include no upwardly extending flanges at all. Furthermore, FIG. 13 shows a lever extension 270 that may be used in connection with lever 150 to provide for additional leverage to move lever 150 into a locked position beneath notch 192 of side wall 190, and to simultaneously raise storage tank 160 into position above, and out of contact with, base plate 210 and the load cell. For example, lever extension 270 may have a hollow opening 274 that may be inserted over first end 154 of lever 150. The lever extension 270 may also include a sloped entry 272 to facilitate entry of the first end 154 of lever 150 into the hollow opening 274. When the lever extension 270 is pushed downwardly, a greater moment of force may be applied, to facilitate moving the lever 150 and storage tank 160 into the raised position with first end 154 of lever 150 moved into position beneath notch 192 in side wall 190. The lever extension 270 may also be used to move the lever 150 and the storage tank 160 from the raised position to the lowered position. The lever extension 270 may be used with first end 154' as well to move the lever 150' and the storage tank 160' from a raised position to a lowered position, and vice versa.

Figure 14A:
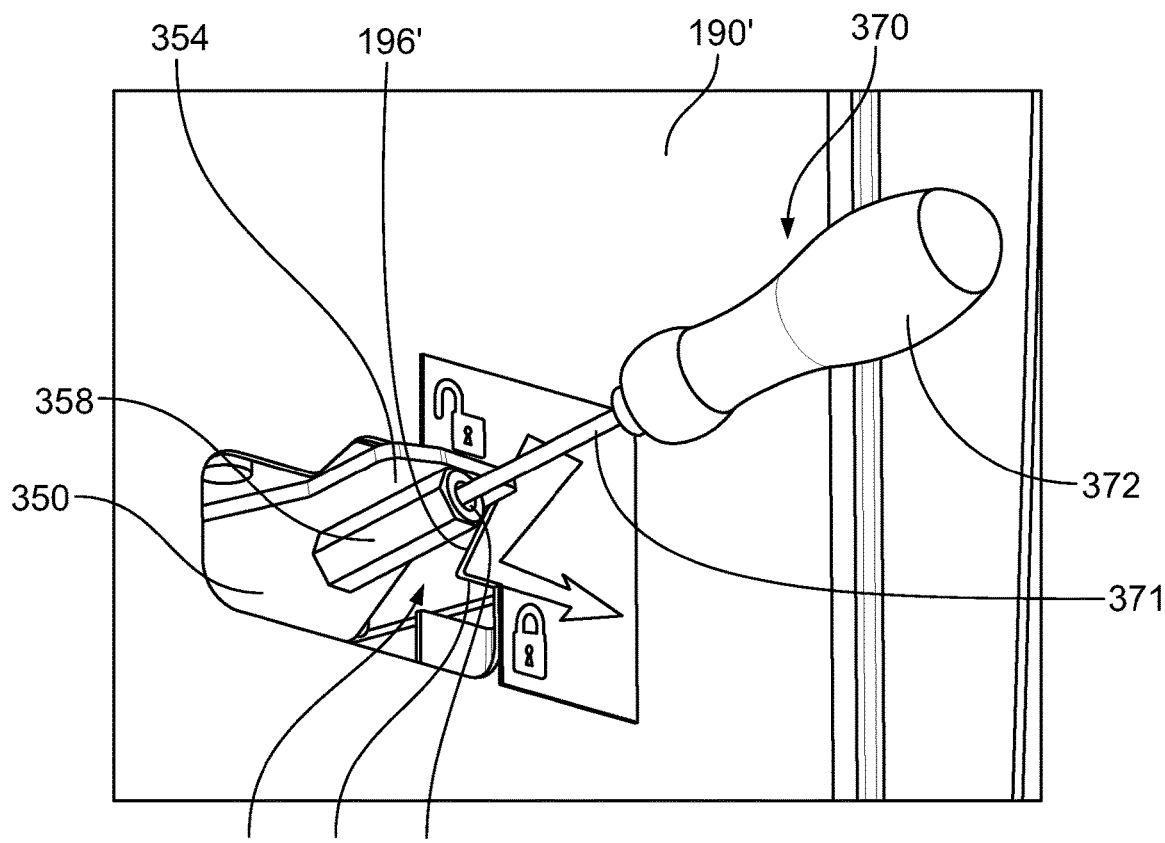
FIG. 14A is a perspective view of lever 350 that may be moved with tool 370 to raise or lower lever 350.
Figure 14B:
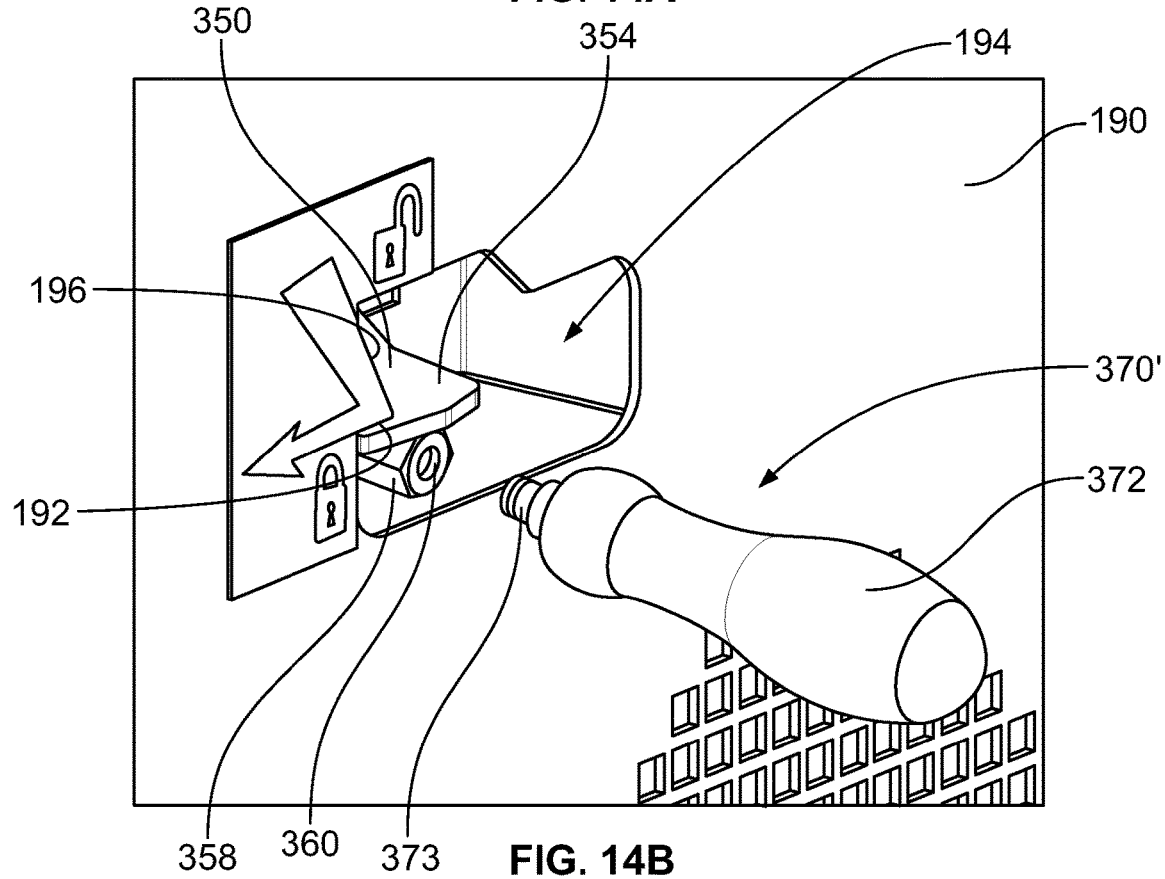
FIG. 14B is a perspective view of lever 350 that may be moved with tool 370' to raise or lower lever 350.

Alternately, as shown in FIGS. 14A and 14B, an end of the lever may be configured to be manipulated by a hand-held tool to move an end of the lever from a raised to a lowered position, and vice versa. In particular, as shown in FIG. 14A, a lever 350 is shown extending through aperture 194' in side wall 190'. A tool receptacle 358 is secured to an underside of end 354 of lever 350. In this example, tool receptacle 358 includes an aperture 359 for receiving an end 371 of tool 370. In this example, tool 370 is a screwdriver having a handle 372 and end 371 that may be inserted into aperture 359 of tool receptacle 358 of end 354 of lever 350. In operation, a user holds handle 372 of tool 370 and inserts end 371 of tool 370 into aperture 359 of tool receptacle 358. To move a second end of lever 350 into a raised position beneath a storage tank, the user pushes down on handle 372 and to the left so that end 354 of lever 350 moves downwardly along sloped wall 196' of aperture 194' in side wall 190' and underneath notch 192' in aperture 194' where lever 350 is positioned in a locked positioned with the second end of lever 350 in a raised position beneath the storage tank (not shown). Tool receptacle 358 may comprise a hex-shaped member that may be welded to end 354 of lever 350. As an example, the hex-shaped member can comprise a metal hex tube. A central opening of the hex tube may be threaded or otherwise. As another example, the hex-shaped member can comprise a six-side coupling nut with an internally-threaded through-hole centrally located about a longitudinal axis of the coupling nut. Tool receptacle 358 and tool 370 provide a user greater leverage in moving end 354 of lever 350 into (and out of) a locked position.

As shown in FIG. 14B, a lever 350 is shown extending through aperture 194 in side wall 190. A tool receptacle 358 is secured to an underside of end 354 of lever 350. In this example, tool receptacle 358 includes a threaded aperture 360 for receiving a threaded end 373 of tool 370'. In this example, tool 370' has a handle 372 and a threaded end 373 that may be screwed into threaded aperture 360 of tool receptacle 358 of end 354 of lever 350. In operation, a user holds handle 372 of tool 370' and screws threaded end 373 of tool 370' into threaded aperture 360 of tool receptacle 358. To move a second end of lever 350 into a raised position beneath a storage tank, the user pushes down on handle 372 and to the right so that end 354 of lever 350 moves downwardly along sloped wall 196 of aperture 194 in side wall 190 and underneath notch 192 in aperture 194 where lever 350 is positioned in a locked position with the second end of lever 350 in a raised position beneath the storage tank (not shown). Tool receptacle 358 may comprise a hex-shaped member that may be welded to end 354 of lever 350. Tool receptacle 358 and tool 370' provide a user greater leverage in moving end 354 of lever 350 into (and out of) a locked position.

FIGS. 14A and 14B show the tool receptacle 358 on an underside of the lever 350. In alternative embodiments, the tool receptacle 358 can be secured to an upper side of the lever 350, opposite the underside of the lever 350. In further alternative embodiments, the tool receptacle 358 can be secured to a vertical edge of the lever 350, the vertical edge extending from the underside of the lever 350 to the upper side of the lever 350. The vertical edge to which the receptacle 358 is secured can be a first vertical edge opposite a second vertical edge that contacts the sloped wall 196' shown in FIG. 14A or the sloped wall 196 shown in FIG. 14B.

For embodiments in which the tool receptacle 358 comprises a hex-shaped member and in which the lever 350 comprises a flat surface, a flat surface of the hex-shaped member can abut the flat surface of the hex-shaped member. In an alternative arrangement, the tool receptacle 358 can comprise a square-shaped member and a flat exterior side of the square-shaped member can abut a flat surface of the lever 350. The square-shaped member can, for example, comprise a square metal tube or one or more square nuts. In yet another alternative arrangement, the tool receptacle can comprise a round-shaped member, such as a round tube.

An advantage of securing a tool receptacle with a flat exterior surface to the lever 350 as compared to securing a tool receptacle without a flat exterior surface (e.g., a round tube) is that a larger surface area contacts the lever 350, which may assist in provided a welded connection, or other connection. Other configurations of tool receptacle 358 are also possible.

Furthermore, other means may be used to raise the storage tank above, and out of contact with, the scale system. For example, a linear or rotary actuator, rack and pinion system, or cylinder may be used to exert a force on the bottom of storage tank 160 to move into a position above, and out of contact with, the scale system. Alternately, a pulley system may be employed that is secured to the top of the storage tank 160 to lift the tank above, and out of contact with, the scale system. Moreover, in some embodiments a base plate 200 may not be used. In addition, in the present embodiments a manually operated lever 150 is illustrated. However, in other embodiments, a button or switch may be used to automatically operate electro-mechanical elements such as the linear or rotary actuators noted above to move the storage tank 160 above, and out of contact with, the scale system.

Figure 11:
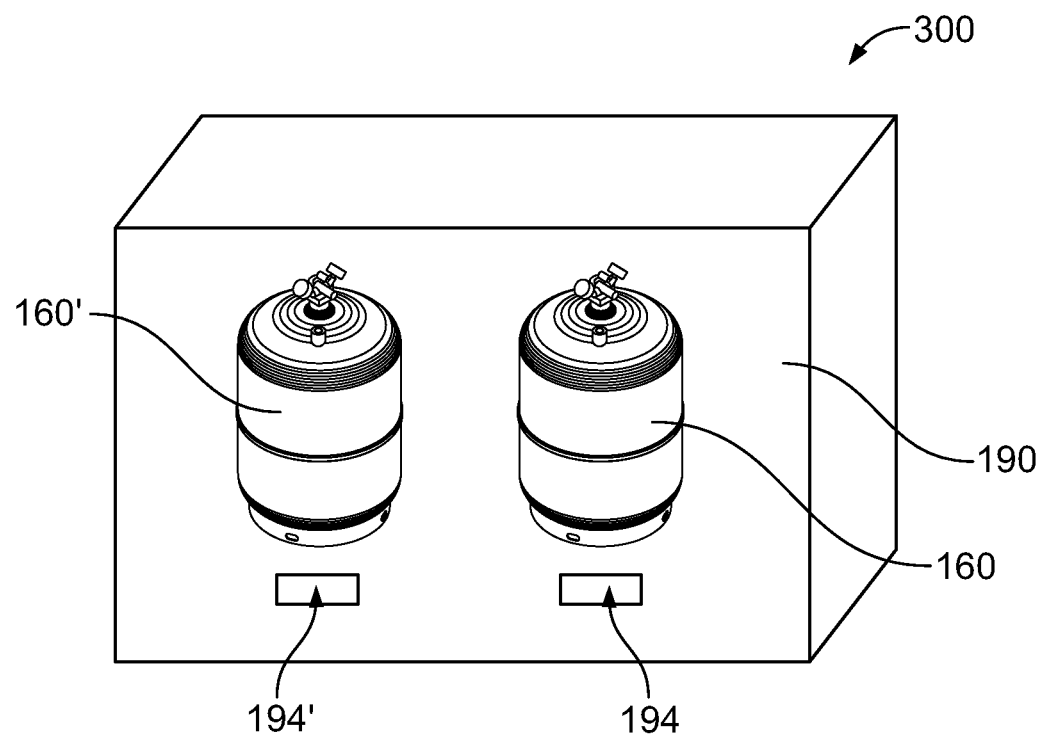
FIG. 11 is a perspective view of refrigerant recovery and delivery unit 300 with storage tanks 160 and 160' shown with lever openings 194 and 194' positioned on the same side wall 190, according to an example embodiment.

FIG. 11 depicts a refrigerant recovery and delivery unit 300 having storage tanks 160 and 160'. In this embodiment, aperture 194 and 194' are positioned on the same side wall 190. Each of the apertures 194 and 194' may have a lever extending therethough useful to move the storage tanks 160 and 160', respectively, into a locked, raised position from an unlocked position.

FIG. 12 depicts a refrigerant recovery and delivery unit 400 having storage tanks 160 and 160'. In this embodiment, a single aperture 194 is positioned in side wall 190. A first end 254 of lever 250 extends through aperture 194 of side wall 190. A second end of lever 250 branches into two ends 250a and 250b, with end 250a positioned beneath storage tank 160' and end 250b positioned beneath storage tank 160. When first end 254 of lever 250 is moved downwardly, end 250a of lever 250 exerts a force on a bottom surface of storage tank 160' to raise storage tank 160' into position above, and out of contact with, a load cell positioned beneath storage tank 160', and at the same time end 250b of lever 250 exerts a force on a bottom surface of storage tank 160 to raise storage tank 160 into position above, and out of contact with, a load cell positioned beneath storage tank 160. In this manner, a single lever may be used to raise both storage tanks 160 and 160'. It will be appreciated that in FIGS. 11 and 12, refrigerant recovery and delivery units 300 and 400 may include aperture 194 having a sloped wall and notch arrangement shown in refrigerant recovery and delivery unit 100 depicted in FIGS. 2-10B described above.

As for the internal components of refrigerant recovery and delivery unit 100, the tank plates 210 and 210', base plates 200 and 200', frame 170, and frame reinforcement 172, and levers 150 and 150' may comprise galvanized sheet metal, which in some cases may be ⅛ inch thick or more. Other materials may also be used.

The base plate 200 may be secured to frame 170 and/or frame reinforcement 172 with any suitable fastener such as bolts, and the frame reinforcement 172 of frame 170 may also be secured to frame 170 with any suitable fastener such as bolts.

In some embodiments, the storage tanks 160 and 160' can also be detachable and/or interchangeable by a user of refrigerant recovery and delivery unit 100. Further, the storage tanks 160 and 160' can include a level indicator that displays to a user of the refrigerant recovery and delivery unit 100 how much of the storage tanks 160 and 160' are filled with fluid (e.g., in case the load cell of scale system 180 is not functioning properly) and/or when the storage tanks 160 or 160' need to be replaced/changed. Further, the storage tanks 160 and 160' can include a temperature probe. The temperature probe could have an analog or digital display that is legible by users of the refrigerant recovery and delivery unit 100, in some embodiments. Additionally or alternatively, the temperature probe could transmit temperature measurements to a control system within the refrigerant recovery and delivery unit 100. The temperature within the storage tanks 160 and 160' can indicate whether refrigerant within the storage tanks 160 or 160' is in a gaseous or a liquid state.

Further, the storage tanks 160 and 160' can have nozzle and/or hose attachments configured to attach the storage tanks 160 or 160' to other components. For example, the storage tanks 160 and 160' can be attachable to a vehicle or to other components within a refrigerant recovery and delivery unit. In some embodiments, the storage tanks 160 and 160' will have a manometer attached to measure pressure within the storage tanks 160 and 160'.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting.

What is claimed is:

1. An apparatus, comprising:
a first storage tank;
a frame positioned at least partially beneath the first storage tank;
a first lever having a first end and a second end, and the first lever is pivotally mounted to the frame; and
a first scale positioned beneath the first storage tank;
wherein in a first position, the first storage tank exerts a force against the first scale system,
wherein in a second position, the second end of the lever exerts a force on a bottom surface of the first storage tank such that the first storage tank is positioned above, and out of contact with, the first scale, when the first storage tank in the second position; and
wherein the first end of the first lever extends through an aperture in a first side wall and the first end of the first lever is operable by a user to move the first lever and first storage tank from the first position to the second position.

2. The apparatus of claim 1, wherein a first tank plate is positioned beneath the bottom of the first storage tank, and in the second position, the second end of the first lever exerts a force against a bottom surface of the first tank plate to exert the force on the bottom surface of the first storage tank.

3. The apparatus of claim 1, wherein the frame comprises a frame reinforcement, and the first lever is pivotally mounted to the frame reinforcement.

4. The apparatus of claim 1, wherein a first base plate is positioned above the frame.

5. The apparatus of claim 1, wherein the second end of the first lever includes a pair of upwardly extending flanges adapted to exert a force against the bottom surface of the first storage tank when the first storage tank is in the second position.

6. The apparatus of claim 5, wherein exposed ends of the pair of upwardly extending flanges of the first lever extend through slots in the frame when the first storage tank is in the second position.

7. The apparatus of claim 6, wherein the exposed ends of the pair of upwardly extending flanges extend through a frame reinforcement that is part of the frame when the first storage tank is in the second position.

8. The apparatus of claim 1, wherein a boundary of the aperture in the first side wall includes a notch and the first end of the first lever is positioned underneath the notch when the first lever and first storage tank are in the second position.

9. The apparatus of claim 8, wherein the boundary of the aperture includes a downwardly extending sloped surface.

10. The apparatus of claim 1, wherein the first end of the first lever includes an aperture that is useful for a user to grip when moving the first lever and first storage tank from the first position to the second position and when moving the first lever and the first storage tank from the second position to the first position.

11. The apparatus of claim 1, wherein the first lever is biased towards the second position by a spring.

12. The apparatus of claim 1, wherein the first end of the first lever is adapted for engagement with a lever extension that provides for additional force to be exerted against the first end of the first lever.

13. The apparatus of claim 1, wherein a tool receptacle is secured to the first end of the first lever, and the tool receptacle includes an aperture for receiving an end of a tool.

14. The apparatus of claim 13, wherein the aperture is threaded and adapted to receive a threaded end of a tool.

15. The apparatus of claim 1, further comprising:
a second storage tank;
a second lever having a first end and a second end, and the second lever is pivotally mounted to the frame; and
a second scale positioned beneath the second storage tank;
wherein in a first position, the second storage tank exerts a force against the second scale, and
wherein in a second position, the second end of the second lever exerts a force on a bottom surface of the second storage tank such that the second storage tank is positioned above, and out of contact with, the second scale, when the second storage tank is in the second position.

16. The apparatus of claim 15, wherein a second tank plate is positioned beneath the bottom of the second storage tank, and in the second position, the second end of the second lever exerts a force against a bottom surface of the second tank plate to exert the force on the bottom surface of the second storage tank.

17. The apparatus of claim 15, wherein the second lever is pivotally mounted to the frame reinforcement.

18. The apparatus of claim 15, wherein a second base plate is positioned above the frame.

19. The apparatus of claim 15, wherein the second end of the second lever includes a pair of upwardly extending flanges adapted to exert a force against the bottom surface of the second storage tank when the second storage tank is in the second position.

20. The apparatus of claim 15, wherein the first end of the second lever extends through an aperture in a second side wall and is operable by a user to move the second lever and second storage tank from the first position to the second position.

21. The apparatus of claim 20, wherein a boundary of the aperture in the second side wall includes a notch and the first end of the second lever is positioned underneath the notch when the second lever and second storage tank are in the second position.

22. The apparatus of claim 15, wherein the second lever is biased towards the second position by a spring.

23. The apparatus of claim 1, further comprising:
a second storage tank; and
a second scale system-positioned beneath the second storage tank;
wherein in the first position, the second storage tank exerts a force against the second scale system, and
wherein in a second position, a portion of the second end of the first lever exerts a force on a bottom surface of the second storage tank such that the second storage tank is positioned above, and out of contact with, the second scale system, when the second storage tank is in the second position.

24. A method, comprising:
providing a first storage tank, and a frame positioned at least partially beneath the first storage tank; and a first lever having a first end and a second end, and the first lever is pivotally mounted to the frame, and a first scale system positioned beneath the first storage tank, wherein in a first position, the first storage tank exerts a force against the first scale, and in a second position, the second end of the first lever exerts a force on a bottom surface of the first storage tank such that the first storage tank is positioned above, and out of contact with, the first scale, when the first storage tank is in the second position;
moving the first storage tank from the first position wherein the first storage tank exerts a force on the first scale to the second position where the first storage tank is positioned above, and out of contact with, the first scale; and
wherein the step of moving the first storage tank from the first position to the second position comprises moving the first end of the first lever such that the second end of the first lever exerts the force against the bottom surface of the first storage tank; and further includes the step of positioning the first end of the first lever underneath a notch in a boundary of an aperture in a first side wall to lock the first end of the first lever and first storage tank into the second position.

25. The method of claim 24, further includes the steps of providing a second storage tank, and a second lever having a first end and a second end, and the second lever pivotally mounted to the frame; and a second scale positioned beneath the second storage tank; wherein in a first position, the second storage tank exerts a force against the second scale, and in a second position, the second end of the second lever exerts a force on a bottom surface of the second storage tank such that the second storage tank is positioned above, and out of contact with, the second scale, when the second storage tank is in the second position; and
moving the second storage tank from the first position wherein the second storage tank exerts a force on the second scale to the second position where the second storage tank is positioned above, and out of contact with, the second scale.

26. The method of claim 25, wherein the step of moving the second storage tank from the first position to the second position comprises moving the first end of the second lever such that the second end of the second lever exerts a force against the bottom surface of the second storage tank; and further includes the step of positioning the first end of the second lever underneath a notch in a boundary of an aperture in a second side wall to lock the first end of the second lever and second storage tank into the second position.

27. The method of claim 24, further including the step of moving the first end of the first lever upwardly to move the first lever and first storage tank from the second position to the first position.

28. The method of claim 24, wherein prior to the step of moving the storage tank, an end of a tool is inserted into an aperture positioned in a tool receptacle secured to the first end of the first lever, and the step of moving the storage tank includes moving a handle of the tool.

29. The method of claim 24, wherein prior to the step of moving the storage tank, a threaded end of a tool is screwed into a threaded aperture positioned in a tool receptacle secured to the first end of the first lever, and the step of moving the storage tank includes moving a handle of the tool.

* * * * *